US012626407B2

(12) United States Patent
Lu et al.

(10) Patent No.: US 12,626,407 B2
(45) Date of Patent: May 12, 2026

(54) CALIBRATING EYE-TRACKING CAMERA OF HEAD-MOUNTED DISPLAY DEVICE

(71) Applicant: Lemon Inc., Grand Cayman (KY)

(72) Inventors: Chien Hung Lu, Los Angeles, CA (US); Bowei Zhang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/902,727

(22) Filed: Sep. 30, 2024

(65) Prior Publication Data

US 2026/0094299 A1 Apr. 2, 2026

(51) Int. Cl.
G06T 7/80 (2017.01)
G06F 3/01 (2006.01)

(52) U.S. Cl.
CPC ................ G06T 7/80 (2017.01); G06F 3/013 (2013.01)

(58) Field of Classification Search
CPC .................................. G06T 7/80; G06F 3/013
See application file for complete search history.

(56) References Cited

U.S. PATENT DOCUMENTS 11,899,209 B2 * 2/2024 Krukowski ........ G02B 27/0093
2020/0209628 A1 * 7/2020 Sztuk ................. G02B 27/0176

OTHER PUBLICATIONS

Schops, T. et al., "Why Having 10,000 Parameters in Your Camera Model is Better Than Twelve," Proceedings of "2020 IEEE/CVF Conference on Computer Vision and Pattern Recognition (CVPR)", Jun. 13, 2020, Seattle, WA, 10 pages.
Zhang, Z., "Flexible Camera Calibration By Viewing a Plane From Unknown Orientations," Proceedings of "Seventh IEEE International Conference on Computer Vision", Sep. 20, 1999, Kerkyra, Greece, 8 pages.

* cited by examiner

Primary Examiner — Matthew A Eason
Assistant Examiner — Scott D Au
(74) Attorney, Agent, or Firm — Alleman Hall LLP

(57) ABSTRACT

A computing system including one or more processing devices configured to calibrate an eye-tracking camera. Calibrating the eye-tracking camera includes receiving lens tolerance range data associated with intrinsic parameters and position parameters of a pancake lens, and further includes receiving image data of one or more ground-truth features. Calibrating the eye-tracking camera further includes, over a plurality of solver iterations, computing estimated values of the intrinsic parameters and position parameters. In each solver iteration, the one or more processing devices compute one or more estimated feature locations based on the image data and perturbed values of the intrinsic parameters and position parameters. The one or more processing devices evaluate a loss function based on the one or more estimated feature locations and ground-truth locations. The one or more processing devices update the perturbed values. Calibrating the eye-tracking camera further includes outputting the perturbed values computed in a final iteration.

20 Claims, 14 Drawing Sheets

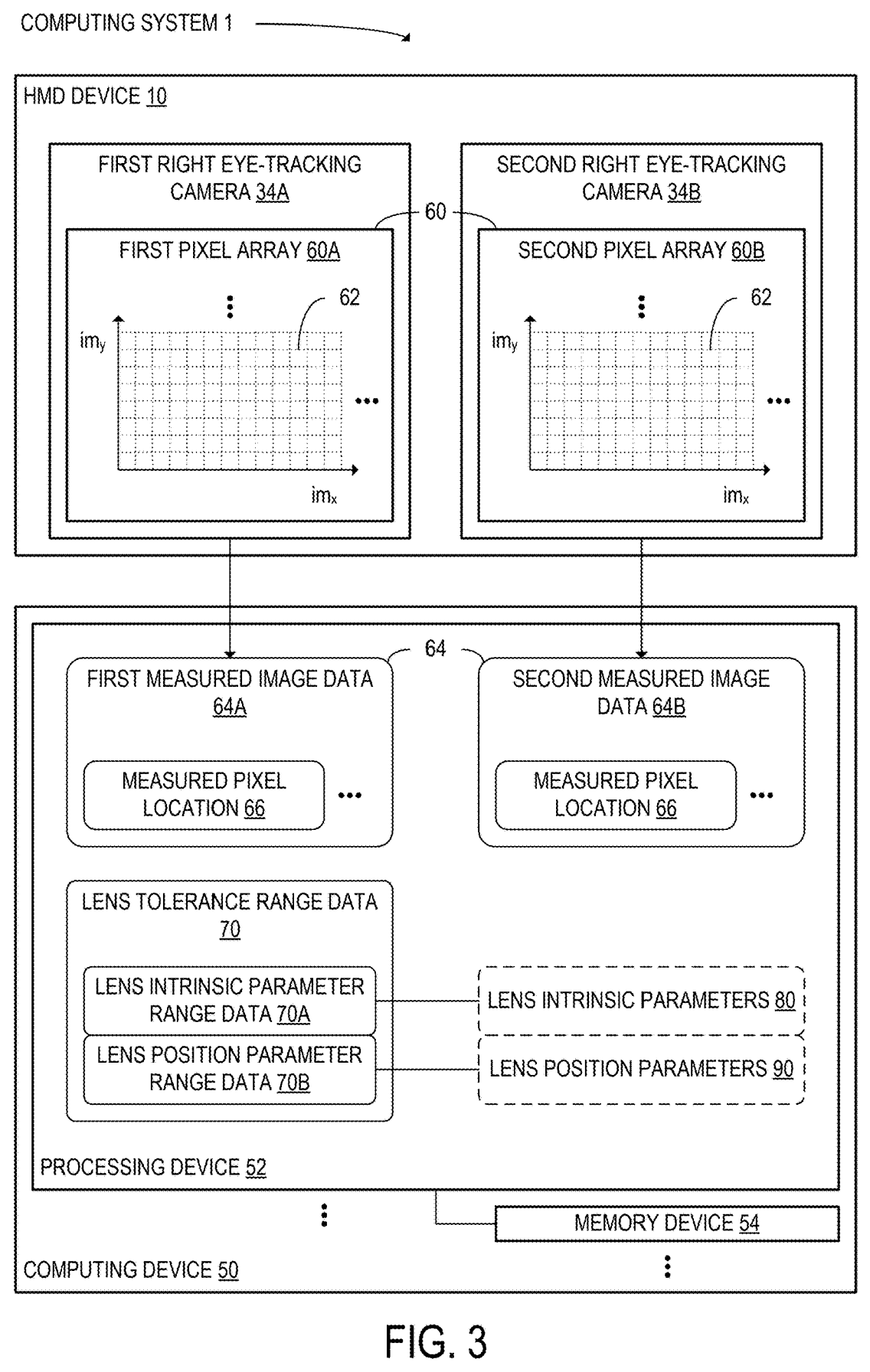

COMPUTING SYSTEM 1

HMD DEVICE 10

FIRST RIGHT EYE-TRACKING CAMERA 34A

FIRST PIXEL ARRAY 60A $im_y$ $im_x$

62

60

SECOND RIGHT EYE-TRACKING CAMERA 34B

SECOND PIXEL ARRAY 60B $im_y$ $im_x$

62

FIRST MEASURED IMAGE DATA 64A

MEASURED PIXEL LOCATION 66

64

SECOND MEASURED IMAGE DATA 64B

MEASURED PIXEL LOCATION 66

LENS TOLERANCE RANGE DATA 70

LENS INTRINSIC PARAMETER RANGE DATA 70A

LENS POSITION PARAMETER RANGE DATA 70B

LENS INTRINSIC PARAMETERS 80

LENS POSITION PARAMETERS 90

PROCESSING DEVICE 52

MEMORY DEVICE 54

COMPUTING DEVICE 50

FIG. 3

COMPUTING SYSTEM 1

COMPUTING DEVICE 50

MEMORY DEVICE 54 ⋯

PROCESSING DEVICE 52

CALIBRATION RESULTS 120

⋮

HMD DEVICE 10

HMD DEVICE MEMORY 24

CALIBRATION RESULTS 120

FIRST EYE-TRACKING CAMERA 34A

SECOND EYE-TRACKING CAMERA 34B

CALIBRATION RESULTS 120

FIRST EYE-TRACKING DATA 202

SECOND EYE-TRACKING DATA 204

EYE TRACKING DATA 200

GAZE DIRECTION 206

ADDITIONAL COMPUTING PROCESS 208

HMD DEVICE PROCESSOR 22

Figure 10A:
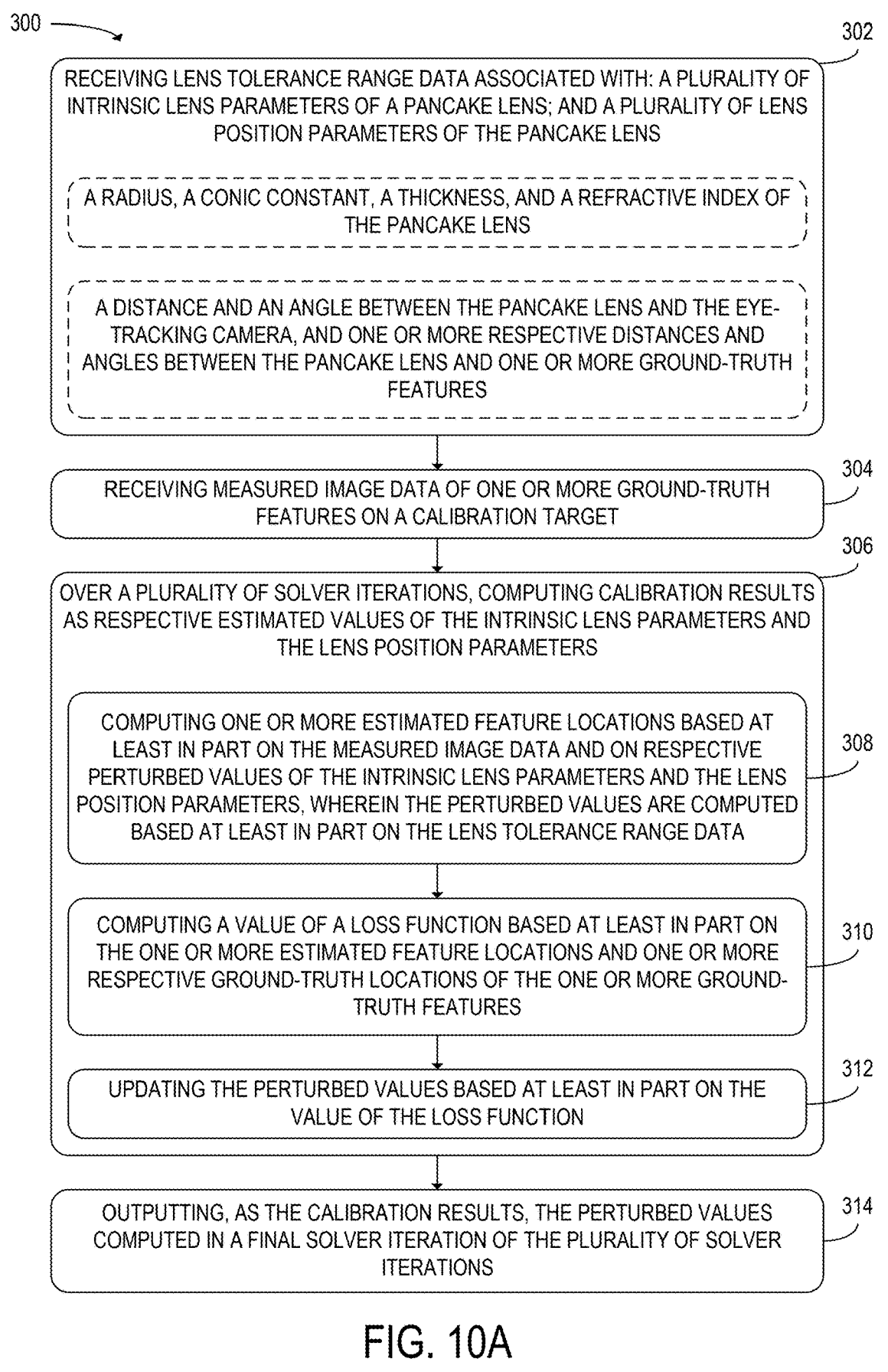

300 ⟶

302

RECEIVING LENS TOLERANCE RANGE DATA ASSOCIATED WITH: A PLURALITY OF INTRINSIC LENS PARAMETERS OF A PANCAKE LENS; AND A PLURALITY OF LENS POSITION PARAMETERS OF THE PANCAKE LENS

A RADIUS, A CONIC CONSTANT, A THICKNESS, AND A REFRACTIVE INDEX OF THE PANCAKE LENS

A DISTANCE AND AN ANGLE BETWEEN THE PANCAKE LENS AND THE EYE-TRACKING CAMERA, AND ONE OR MORE RESPECTIVE DISTANCES AND ANGLES BETWEEN THE PANCAKE LENS AND ONE OR MORE GROUND-TRUTH FEATURES

304

RECEIVING MEASURED IMAGE DATA OF ONE OR MORE GROUND-TRUTH FEATURES ON A CALIBRATION TARGET

306

OVER A PLURALITY OF SOLVER ITERATIONS, COMPUTING CALIBRATION RESULTS AS RESPECTIVE ESTIMATED VALUES OF THE INTRINSIC LENS PARAMETERS AND THE LENS POSITION PARAMETERS

COMPUTING ONE OR MORE ESTIMATED FEATURE LOCATIONS BASED AT LEAST IN PART ON THE MEASURED IMAGE DATA AND ON RESPECTIVE PERTURBED VALUES OF THE INTRINSIC LENS PARAMETERS AND THE LENS POSITION PARAMETERS, WHEREIN THE PERTURBED VALUES ARE COMPUTED BASED AT LEAST IN PART ON THE LENS TOLERANCE RANGE DATA

308

COMPUTING A VALUE OF A LOSS FUNCTION BASED AT LEAST IN PART ON THE ONE OR MORE ESTIMATED FEATURE LOCATIONS AND ONE OR MORE RESPECTIVE GROUND-TRUTH LOCATIONS OF THE ONE OR MORE GROUND-TRUTH FEATURES

310

UPDATING THE PERTURBED VALUES BASED AT LEAST IN PART ON THE VALUE OF THE LOSS FUNCTION

312

OUTPUTTING, AS THE CALIBRATION RESULTS, THE PERTURBED VALUES COMPUTED IN A FINAL SOLVER ITERATION OF THE PLURALITY OF SOLVER ITERATIONS

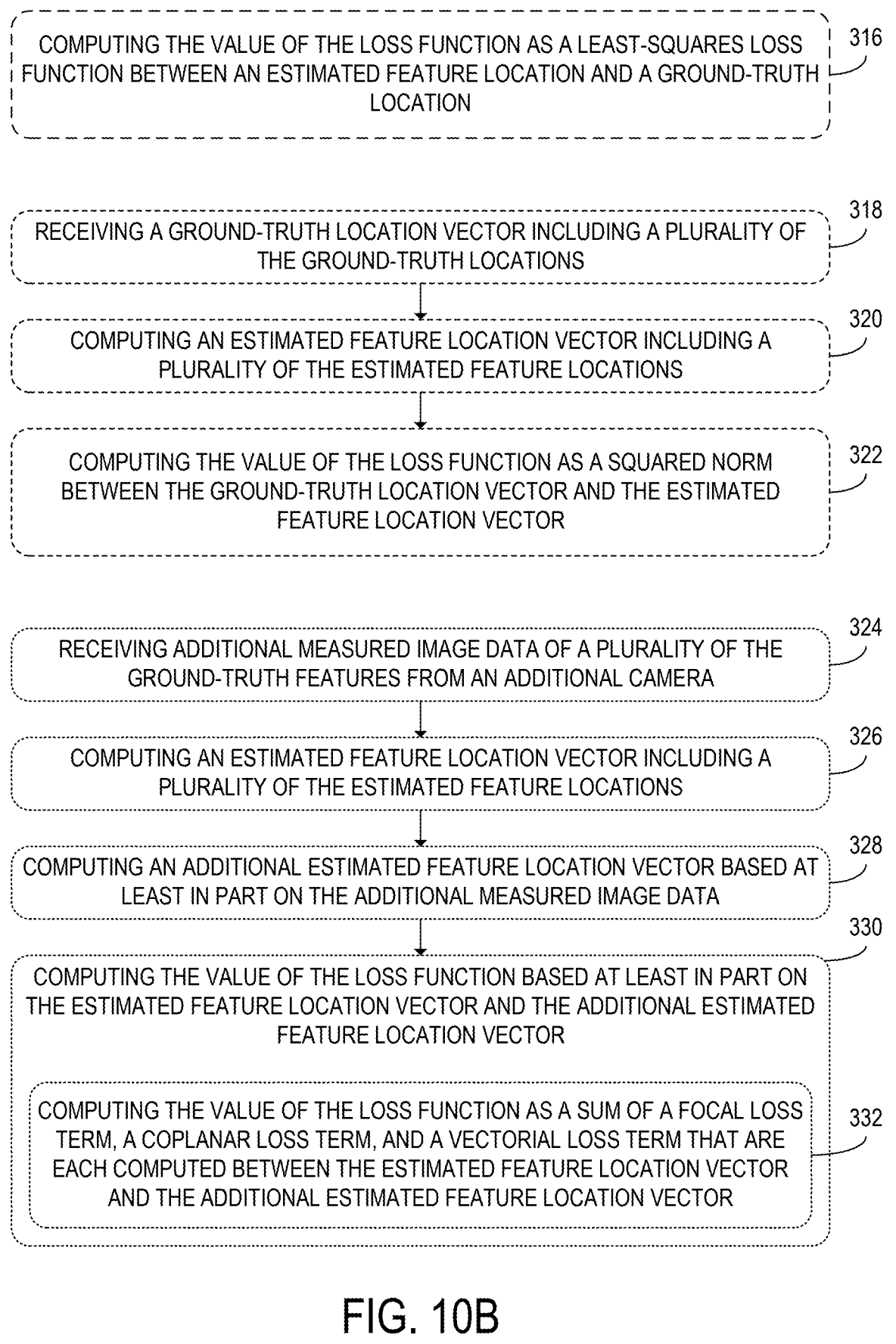

COMPUTING THE VALUE OF THE LOSS FUNCTION AS A LEAST-SQUARES LOSS FUNCTION BETWEEN AN ESTIMATED FEATURE LOCATION AND A GROUND-TRUTH LOCATION — 316

RECEIVING A GROUND-TRUTH LOCATION VECTOR INCLUDING A PLURALITY OF THE GROUND-TRUTH LOCATIONS — 318

COMPUTING AN ESTIMATED FEATURE LOCATION VECTOR INCLUDING A PLURALITY OF THE ESTIMATED FEATURE LOCATIONS — 320

COMPUTING THE VALUE OF THE LOSS FUNCTION AS A SQUARED NORM BETWEEN THE GROUND-TRUTH LOCATION VECTOR AND THE ESTIMATED FEATURE LOCATION VECTOR — 322

RECEIVING ADDITIONAL MEASURED IMAGE DATA OF A PLURALITY OF THE GROUND-TRUTH FEATURES FROM AN ADDITIONAL CAMERA — 324

COMPUTING AN ESTIMATED FEATURE LOCATION VECTOR INCLUDING A PLURALITY OF THE ESTIMATED FEATURE LOCATIONS — 326

COMPUTING AN ADDITIONAL ESTIMATED FEATURE LOCATION VECTOR BASED AT LEAST IN PART ON THE ADDITIONAL MEASURED IMAGE DATA — 328

COMPUTING THE VALUE OF THE LOSS FUNCTION BASED AT LEAST IN PART ON THE ESTIMATED FEATURE LOCATION VECTOR AND THE ADDITIONAL ESTIMATED FEATURE LOCATION VECTOR — 330

COMPUTING THE VALUE OF THE LOSS FUNCTION AS A SUM OF A FOCAL LOSS TERM, A COPLANAR LOSS TERM, AND A VECTORIAL LOSS TERM THAT ARE EACH COMPUTED BETWEEN THE ESTIMATED FEATURE LOCATION VECTOR AND THE ADDITIONAL ESTIMATED FEATURE LOCATION VECTOR — 332

FIG. 10B

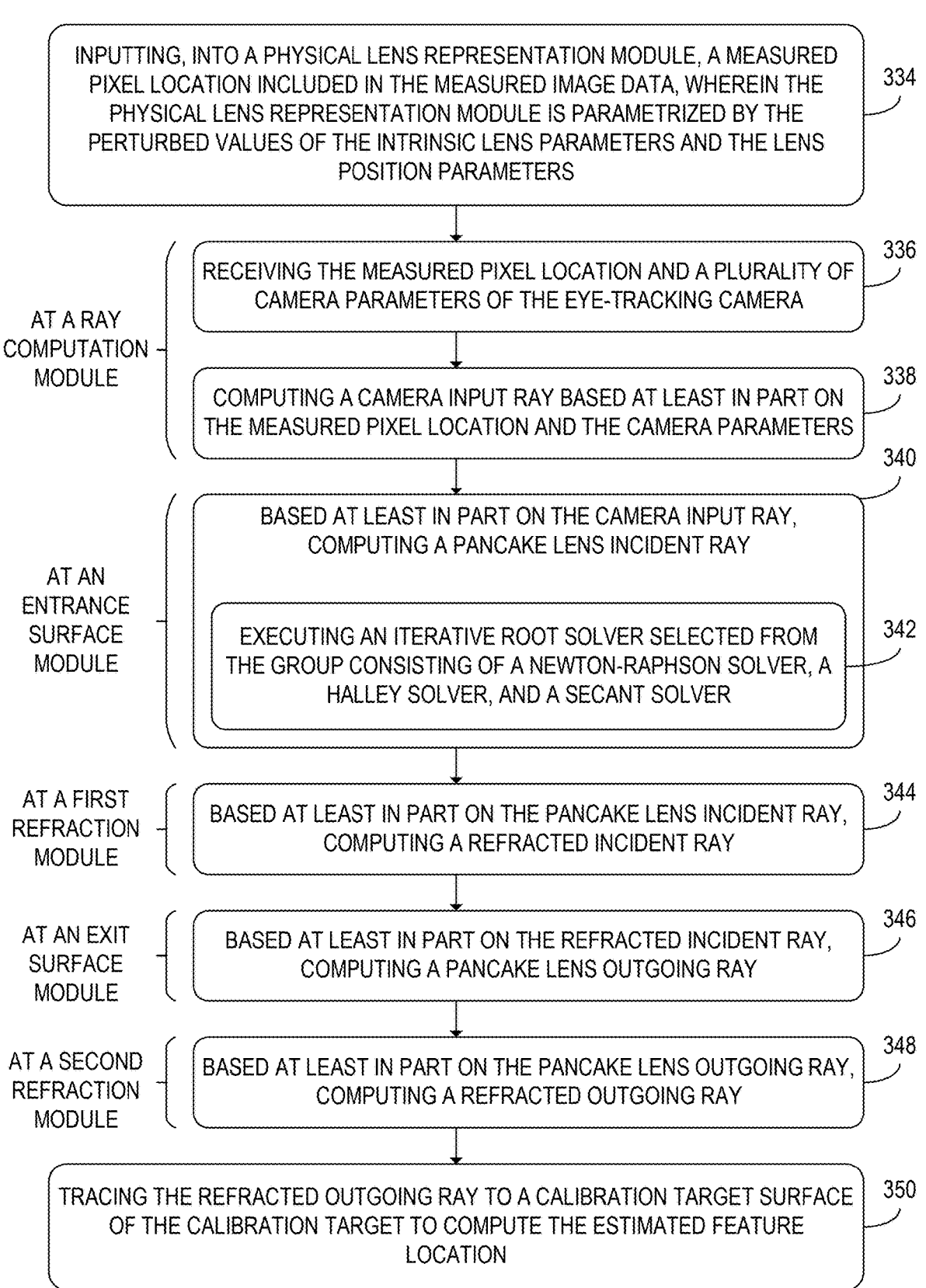

INPUTTING, INTO A PHYSICAL LENS REPRESENTATION MODULE, A MEASURED PIXEL LOCATION INCLUDED IN THE MEASURED IMAGE DATA, WHEREIN THE PHYSICAL LENS REPRESENTATION MODULE IS PARAMETRIZED BY THE PERTURBED VALUES OF THE INTRINSIC LENS PARAMETERS AND THE LENS POSITION PARAMETERS ⟩ 334

AT A RAY COMPUTATION MODULE

RECEIVING THE MEASURED PIXEL LOCATION AND A PLURALITY OF CAMERA PARAMETERS OF THE EYE-TRACKING CAMERA ⟩ 336

COMPUTING A CAMERA INPUT RAY BASED AT LEAST IN PART ON THE MEASURED PIXEL LOCATION AND THE CAMERA PARAMETERS ⟩ 338

340

AT AN ENTRANCE SURFACE MODULE

BASED AT LEAST IN PART ON THE CAMERA INPUT RAY, COMPUTING A PANCAKE LENS INCIDENT RAY

EXECUTING AN ITERATIVE ROOT SOLVER SELECTED FROM THE GROUP CONSISTING OF A NEWTON-RAPHSON SOLVER, A HALLEY SOLVER, AND A SECANT SOLVER ⟩ 342

AT A FIRST REFRACTION MODULE

BASED AT LEAST IN PART ON THE PANCAKE LENS INCIDENT RAY, COMPUTING A REFRACTED INCIDENT RAY ⟩ 344

AT AN EXIT SURFACE MODULE

BASED AT LEAST IN PART ON THE REFRACTED INCIDENT RAY, COMPUTING A PANCAKE LENS OUTGOING RAY ⟩ 346

AT A SECOND REFRACTION MODULE

BASED AT LEAST IN PART ON THE PANCAKE LENS OUTGOING RAY, COMPUTING A REFRACTED OUTGOING RAY ⟩ 348

TRACING THE REFRACTED OUTGOING RAY TO A CALIBRATION TARGET SURFACE OF THE CALIBRATION TARGET TO COMPUTE THE ESTIMATED FEATURE LOCATION ⟩ 350

FIG. 10C

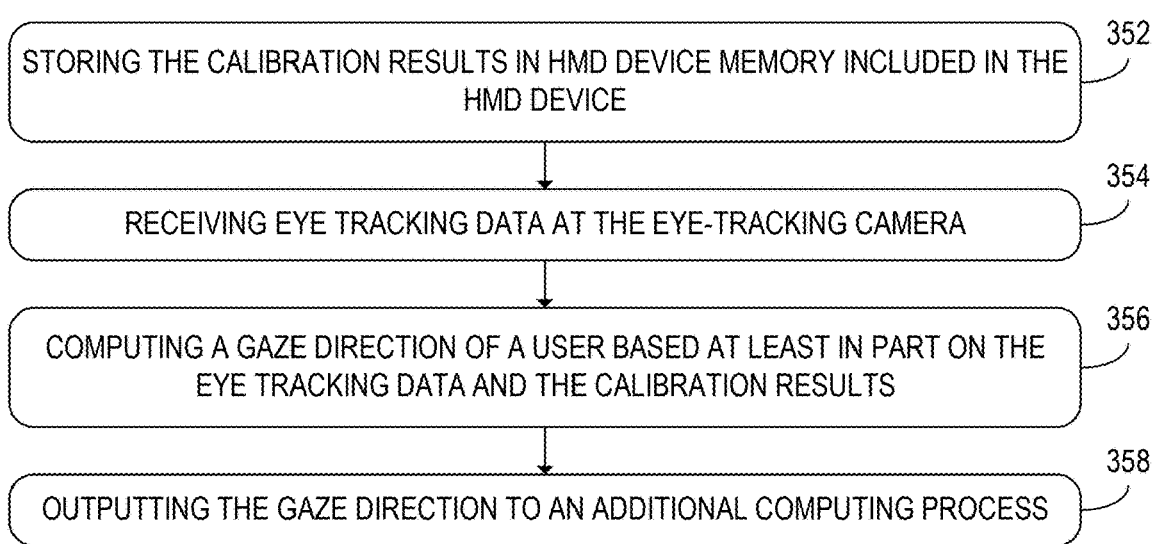

352 — STORING THE CALIBRATION RESULTS IN HMD DEVICE MEMORY INCLUDED IN THE HMD DEVICE

354 — RECEIVING EYE TRACKING DATA AT THE EYE-TRACKING CAMERA

356 — COMPUTING A GAZE DIRECTION OF A USER BASED AT LEAST IN PART ON THE EYE TRACKING DATA AND THE CALIBRATION RESULTS

358 — OUTPUTTING THE GAZE DIRECTION TO AN ADDITIONAL COMPUTING PROCESS

FIG. 10D

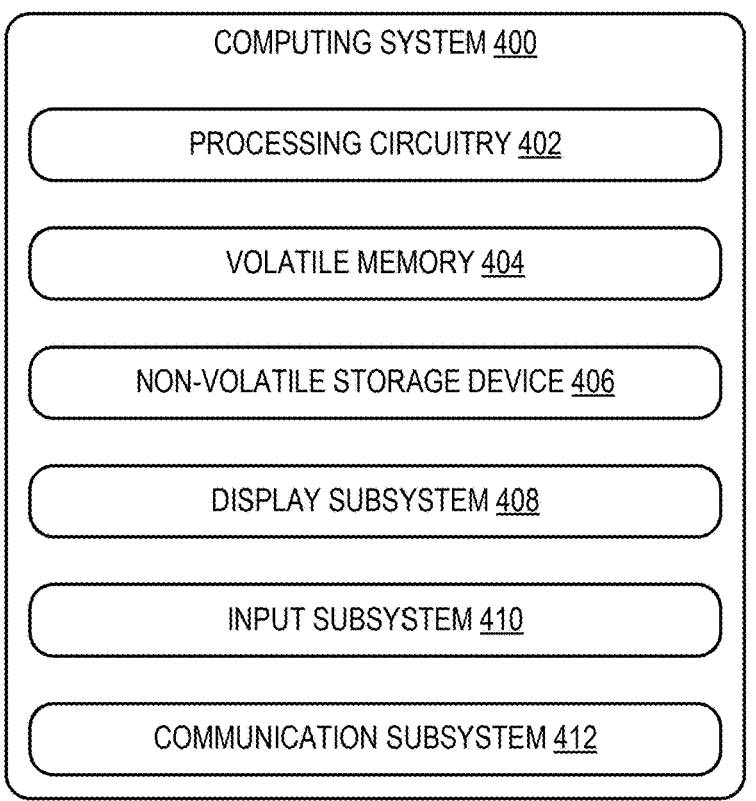

COMPUTING SYSTEM 400

PROCESSING CIRCUITRY 402

VOLATILE MEMORY 404

NON-VOLATILE STORAGE DEVICE 406

DISPLAY SUBSYSTEM 408

INPUT SUBSYSTEM 410

COMMUNICATION SUBSYSTEM 412

FIG. 11

CALIBRATING EYE-TRACKING CAMERA OF HEAD-MOUNTED DISPLAY DEVICE

BACKGROUND

A head-mounted display (HMD) device such as a virtual reality (VR) device or an augmented reality (AR) device typically includes an eye-tracking camera. The eye-tracking camera faces inward toward the eyes of the user and tracks the user's gaze direction. The gaze direction may be used, for example, as a user input mechanism to select and interact with displayed virtual objects.

Slight differences in the shape of lenses in the HMD can result from tolerances in manufacturing processes. To account for these, the eye tracking camera can be calibrated using software. As discussed below, there are technical challenges associated with such calibration, and opportunities exist to address those challenges.

SUMMARY

According to one aspect of the present disclosure, a computing system is provided, including one or more processing devices configured to calibrate an eye-tracking camera included in a head-mounted display (HMD) device between a pancake lens and a display panel. Calibrating the eye-tracking camera includes receiving lens tolerance range data associated with a plurality of intrinsic lens parameters of the pancake lens and a plurality of lens position parameters of the pancake lens. Calibrating the eye-tracking camera further includes receiving measured image data of one or more ground-truth features on a calibration target. Calibrating the eye-tracking camera further includes, over a plurality of solver iterations, computing calibration results as respective estimated values of the intrinsic lens parameters and the lens position parameters. In each of the solver iterations, the one or more processing devices are configured to compute one or more estimated feature locations based at least in part on the measured image data and on respective perturbed values of the intrinsic lens parameters and the lens position parameters. The perturbed values are computed based at least in part on the lens tolerance range data. The one or more processing devices are further configured to compute a value of a loss function based at least in part on the one or more estimated feature locations and one or more respective ground-truth locations of the one or more ground-truth features. The one or more processing devices are further configured to update the perturbed values based at least in part on the value of the loss function. Calibrating the eye-tracking camera further includes outputting, as the calibration results, the perturbed values computed in a final solver iteration of the plurality of solver iterations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 schematically shows a computing system, including the HMD device and another computing device, when the other computing device receives measured image data and lens tolerance range data, according to the example of FIG. 1.

FIG. 10A shows a flowchart of a method of calibrating an eye-tracking camera that is included in an HMD device between a pancake lens and a display panel, according to the example of FIG. 1.

FIG. 10B shows additional steps of the method of FIG. 10A that may be performed at the perturbative solver to compute the value of a loss function.

FIG. 10C shows additional steps of the method of FIG. 10A that may be performed to compute an estimated feature location.

FIG. 10D shows additional steps of the method of FIG. 10A that may be performed in some examples subsequently to computing the calibration results.

FIG. 11 shows a schematic view of an example computing environment in which the computing system of FIG. 3 may be instantiated.

DETAILED DESCRIPTION

Figure 1:
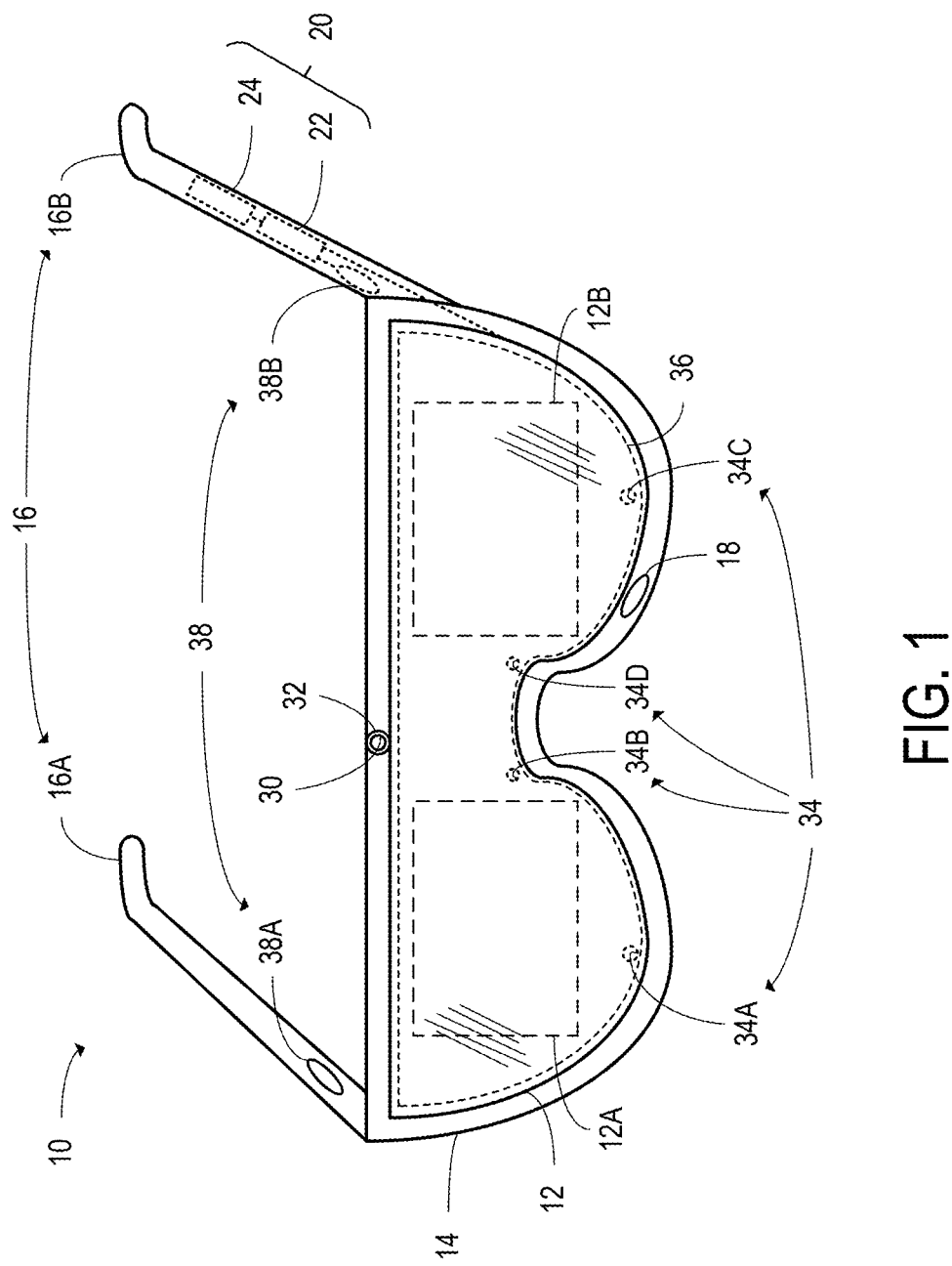
FIG. 1 schematically shows an example head-mounted display (HMD) device, according to one example embodiment.

In some HMD devices, one or more eye-tracking cameras are located within the display. For example, the one or more eye-tracking cameras may be located between a pancake lens and a display panel. Positioning an eye-tracking camera inside the display may allow the HMD to have a form factor in which the eye-tracking camera does not protrude from the inner surface of the display panel. Positioning the one or more eye-tracking cameras within the display may enable the HMD to be more compact, comfortable, and pleasing in appearance, as compared to designs that position the eye-tracking cameras outside of the HMD.

However, positioning an eye-tracking camera between the pancake lens and the display panel leads to difficulties in eye-tracking camera calibration, since the eye-tracking camera receives light through the pancake lens. The pancake lens produces optical distortion and diverges the rays of light that are received at the eye-tracking camera. Some existing methods of calibrating an eye-tracking camera located between a pancake lens and a display panel rely on the pinhole assumption. However, these pinhole camera models do not sufficiently account for the properties of the pancake lens. Small differences in the properties of the pancake lens, such as thickness and curvature, can affect the accuracy of the eye-tracking camera calibration. Pinhole camera models of eye-tracking camera calibration may accordingly have low accuracy.

As an alternative to pinhole camera models, black-box models of eye-tracking camera calibration have also been developed. Black-box models are constructed from data sets of three-dimensional (3D) points in object space that are paired with respective two-dimensional (2D) points in image space. Black-box methods further include fitting a 3D-2D position relation using basis functions. However, these black-box methods rely on large numbers of parameters and data points. These large parameter counts and data set sizes frequently lead to overfitting, resulting in less accurate performance. In addition, black-box methods do not represent the physical properties of the camera system in an interpretable manner. Thus, dynamic distortion compensation (DDC) and dynamic color compensation (DCC) may be unusable with black-box approaches, since DDC and DCC utilize geometric information about the camera system. Obtaining these geometric properties may require additional measurements, thereby increasing HMD device production costs.

In order to address the shortcomings of the above approaches to eye-tracking camera calibration, a calibration method is presented herein that utilizes a physically interpretable model of the lens-camera system. The physically interpretable calibration method uses manufacturing tolerance range data associated with physical parameters of the pancake lens and uses calibration measurements to estimate values of those physical parameters within the tolerance ranges. The approaches discussed below result in higher accuracy than either pinhole camera methods or black-box methods. In addition, since the estimated parameters correspond to physical properties of the pancake lens, the approach discussed below allows DDC and DCC to be performed without having to collect additional measurements.

FIG. 1 schematically shows an example HMD device 10 with which the physically interpretable calibration method may be used. The HMD device 10 of FIG. 1 has a glasses form factor and includes a display 12 mounted in a frame 14. The HMD device 10 may be a VR device that includes an opaque display 12 or an AR device that includes a transparent display 12. In the example of FIG. 1, the display 12 includes a right addressable region 12A and a left addressable region 12B at which the HMD device 10 is configured to display respective images to the right eye and left eye of the user. The HMD device 10 further includes temple sections 16 (a right temple section 16A and a left temple section 16B) that are coupled to the frame 14 and are configured to support the HMD device 10 when worn by a user.

The HMD device 10 further includes computing components 20, which include an HMD device processor 22 coupled to HMD device memory 24. Other computing components 20, such as one or more specialized hardware accelerators, may also be included in the HMD device 10 in some examples. The HMD device processor 22 is configured to process input data received from sensors and user input devices included in the HMD device 10, as well as data received from other computing devices. The HMD device processor 22 is accordingly configured to control images displayed on the display 12, as well as outputs to any other output devices included in the HMD device 10.

The HMD device 10 further includes a front-facing camera 30 and a front-facing camera lens 32. In the example of FIG. 1, the front-facing camera 30 is embedded within the frame 14. The front-facing camera lens 32 is located on an outer surface of the frame 14 relative to the front-facing camera 30. The front-facing camera 30 is accordingly configured to image, through the front-facing camera lens 32, the environment in which the HMD device 10 is located.

The HMD device 10 shown in the example of FIG. 1 further includes a plurality of eye-tracking cameras 34 and a pancake lens 36. The pancake lens 36 is positioned across the display 12 in a user-facing direction and is configured to refract light that passes from the external environment, the first addressable region 12A, and the second addressable region 12B toward the user's eyes. The eye-tracking cameras 34 are configured to image the eyes of the user through the pancake lens 36. In this example, the HMD device 10 includes a first right eye-tracking camera 34A, a second right eye-tracking camera 34B, a first left eye-tracking camera 34C, and a second left eye-tracking camera 34D. The first right eye-tracking camera 34A shown in FIG. 1 has a six-o-clock position proximate to a lowermost point on the right side of the display 12. The second right eye-tracking camera 34B has a right-side nasal position proximate to a bridge of the HMD device 10. Similarly, the first left eye-tracking camera 34C has a six-o-clock position proximate to a lowermost point on the left side of the display 12, and the second left eye-tracking camera 34D has a left-side nasal position proximate to the bridge.

The HMD device of FIG. 1 further includes a microphone 18 configured to collect audio inputs such as the speech of the user. In addition, the HMD device 10 includes a plurality of speakers 38. FIG. 1 shows a right speaker 38A located in the right temple section 16A and a left speaker 38B located in the left temple section 16B. The right speaker 38A and the left speaker 38B are accordingly configured to the right ear and left ear of the user, respectively.

Figure 2B:
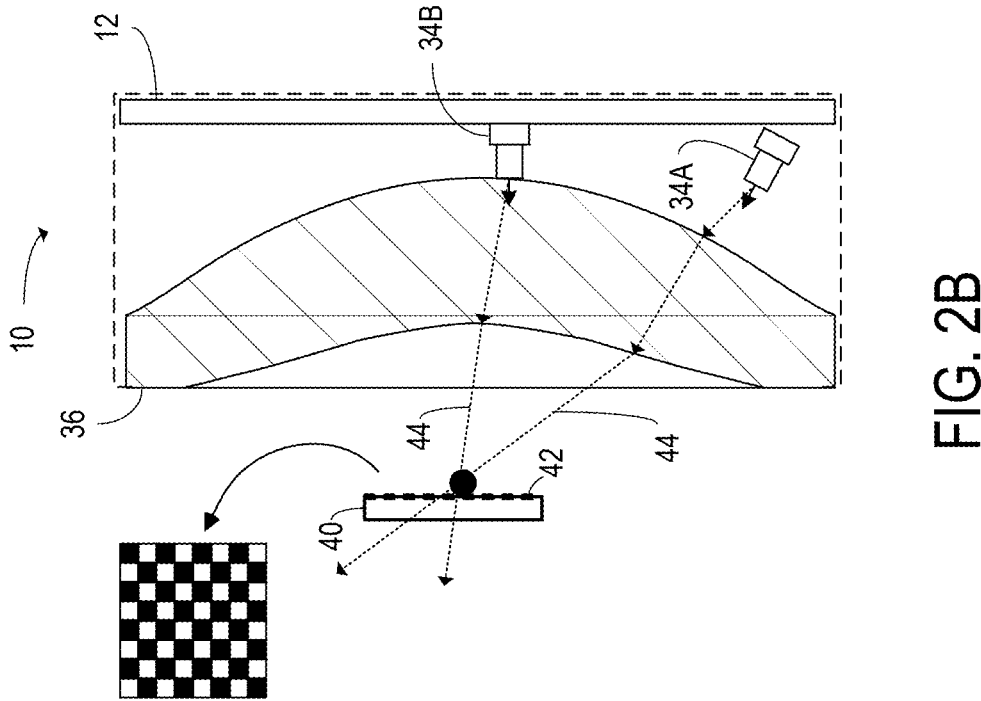
FIG. 2B schematically shows the first eye-tracking camera, the second eye-tracking camera, and the pancake lens during calibration of the eye-tracking cameras, according to the example of FIG. 2A.
Figure 2A:
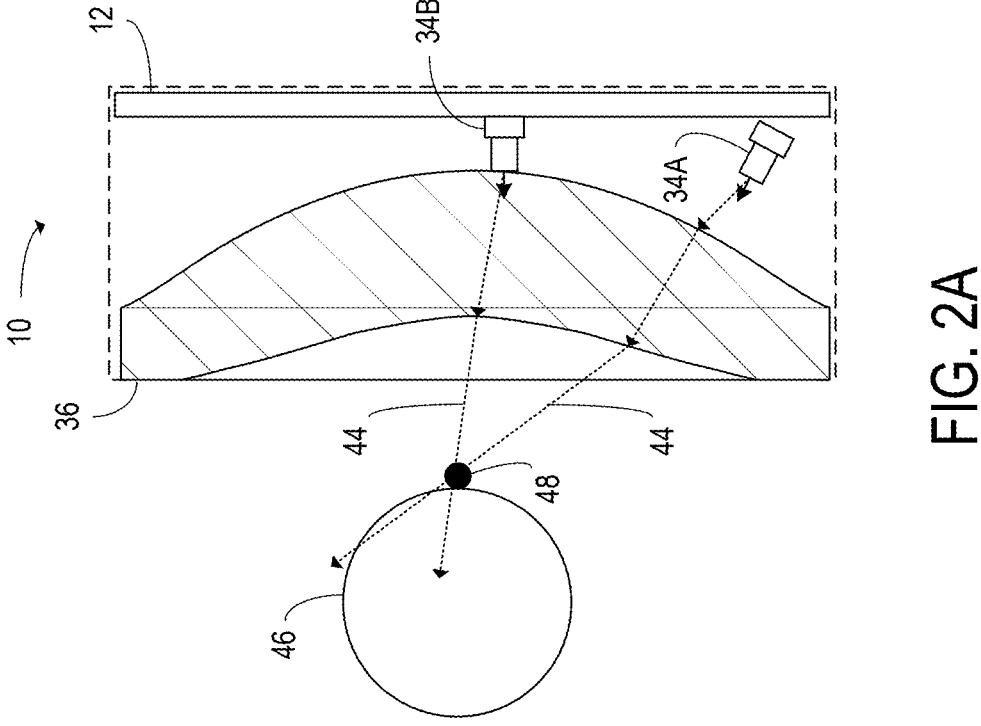
FIG. 2A schematically shows a first eye-tracking camera, a second eye-tracking camera, and a pancake lens when the first eye-tracking camera and the second eye-tracking camera collect image data of a user's eye, according to the example of FIG. 1.

FIG. 2A schematically shows the first right eye-tracking camera 34A, the second right eye-tracking camera 34B, and the pancake lens 36 when the first right eye-tracking camera 34A and the second right eye-tracking camera 34B collect image data of a user's eye 46. The first left eye-tracking camera 34C and the second left eye-tracking camera 34D may also have positions corresponding to those of the first right eye-tracking camera 34A and the second right eye-tracking camera 34B shown in FIG. 2A. FIG. 2A shows rays 44 that pass through the pancake lens 36 from the right eye-tracking cameras 34A and 34B and impinge upon the user's eye 46 at an entrance pupil 48. These rays 44 undergo refraction as they enter and leave the pancake lens 36. FIG. 2A further shows the display 12 located in an outward direction from the user's eye 46 relative to the pancake lens 36 and the right eye-tracking cameras 34A and 34B.

FIG. 2B schematically shows the first right eye-tracking camera 34A, the second right eye-tracking camera 34B, and the pancake lens 36 during calibration of the right eye-tracking cameras 34A and 34B. Calibration of the right eye-tracking cameras 34A and 34B makes use of a calibration target 40 that has known optical properties and is located at a position similar to that of the right eye of a user. During calibration of the left eye-tracking cameras 34C and 34D, a calibration target 40 may be located at a position similar to that of the left eye of a user. The calibration target 40 shown in the example of FIG. 2B has a patterned surface including a plurality of ground-truth features 42. For example, as shown in FIG. 2B, the calibration target 40 may be a chessboard pattern including squares of known sizes.

During calibration, the right eye-tracking cameras 34A and 34B are configured to image one or more ground-truth features 42 on the calibration target 40. FIG. 2B schematically shows example rays 44 that pass from the ground-truth feature 42 through the pancake lens 36 and impinge upon the right eye-tracking cameras 34A and 34B. The measured locations of the ground-truth feature 42 in the 2D image space of the right eye-tracking cameras 34A and 34B are used as inputs to the calibration procedure, as discussed in further detail below. A plurality of different ground-truth features 42 on the calibration target 40 may be imaged in some examples.

FIG. 3 schematically shows a computing system 1 that includes both the HMD device 10 and another computing device 50. The computing device 50 includes one or more processing devices 52 that are coupled to one or more memory devices 54. The computing device 50 is configured to communicate with the HMD device 10. For example, the computing device 50 may be located in a factory at which the HMD device 10 is manufactured and calibrated. In some examples, the computing device 50 includes a plurality of physical computing devices that are coupled to each other in a network. Although, in the following discussion, computing steps performed during calibration are described as occurring at the one or more processing devices 52 of the computing device 50, those computing steps may alternatively be performed at least in part at the HMD device processor 22 in some examples.

As shown in the example of FIG. 3, the eye-tracking cameras 34 include respective pixel arrays 60. A first pixel array 60A included in the first right eye-tracking camera 34A and a second pixel array 60B included in the second right eye-tracking camera 34B are schematically depicted in FIG. 3. The pixels 62 included in the pixel arrays 60 have respective coordinate locations in those pixel arrays 60 that are indicated as $(im_x, im_y)$.

The HMD device 10 is configured to transmit measured image data 64 of the one or more ground-truth features 42 to the computing device 50. The measured image data 64 includes, for the one or more ground-truth features 42, one or more respective measured pixel locations 66 in a pixel array 60. FIG. 3 shows first measured image data 64A received from the first right eye-tracking camera 34A and second measured image data 64B received from the second right eye-tracking camera 34B.

The computing device 50 is further configured to receive lens tolerance range data 70. The lens tolerance range data 70 indicates manufacturing tolerance ranges for different physical parameters of the pancake lens 36. For example, the lens tolerance range data 70 may indicate mean and standard deviation values of the pancake lens parameters. The lens tolerance range data 70 may, as another example, indicate 90% confidence intervals or 95% confidence intervals for the different parameters of the pancake lens 36. The lens tolerance range data 70 may be obtained from measurements performed on the pancake lenses 36 of a plurality of previously manufactured HMD devices. As shown in FIG. 3, the lens tolerance range data 70 includes lens intrinsic parameter range data 70A associated with a plurality of intrinsic lens parameters 80 of the pancake lens 36. The lens tolerance range data 70 further includes lens position parameter range data 70B associated with a plurality of lens position parameters 90 of the pancake lens 36.

Figure 4:
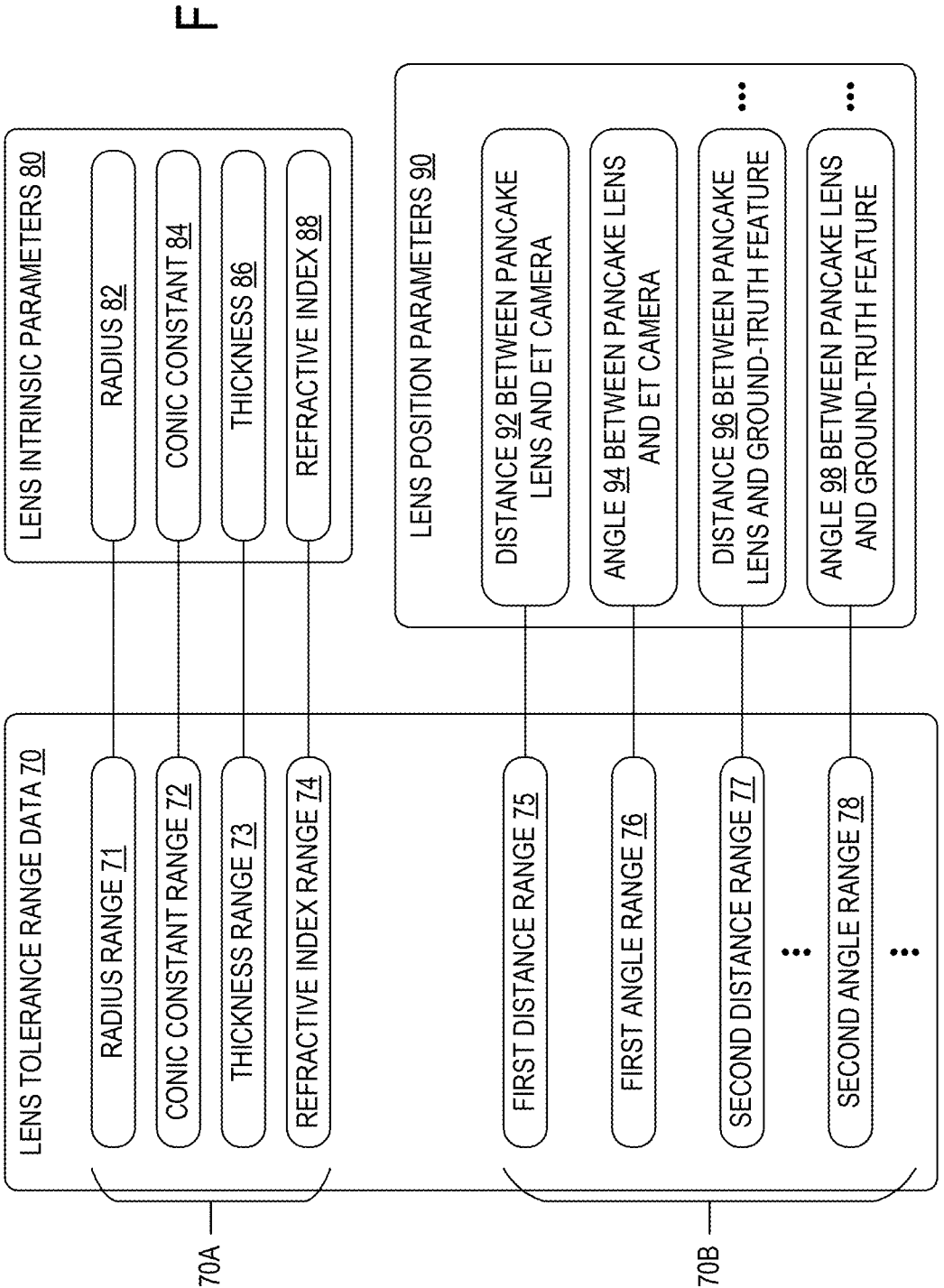
FIG. 4 schematically shows example quantities that may be included in the lens tolerance range data, according to the example of FIG. 3.

FIG. 4 schematically shows example quantities that may be included in the lens tolerance range data 70. In the example of FIG. 4, the intrinsic lens parameters 80 include a radius 82, a conic constant 84, a thickness 86, and a refractive index 88 of the pancake lens 36. The lens intrinsic parameter range data 70A may accordingly include a radius range 71 of values of the radius 82, a conic constant range 72 of values of the conic constant 84, a thickness range 73 of values of the thickness 86, and a refractive index range 74 of values of the refractive index 88.

In the example of FIG. 4, the lens position parameters 90 include a distance 92 and an angle 94 between the pancake lens 36 and the eye-tracking camera 34. The lens position parameters 90 may include a respective distance 92 and angle 94 for each of the eye-tracking cameras 34. The lens position parameters 90 further include one or more respective distances 96 and angles 98 between the pancake lens 36 and the one or more ground-truth features 42. Accordingly, the lens position parameter range data 70B includes a first distance range 75 associated with the distance 92, a first angle range 76 associated with the angle 94, one or more second distance ranges 77 associated with the one or more distances 96, and one or more second angle ranges 78 associated with the one or more angles 98.

Figure 5:
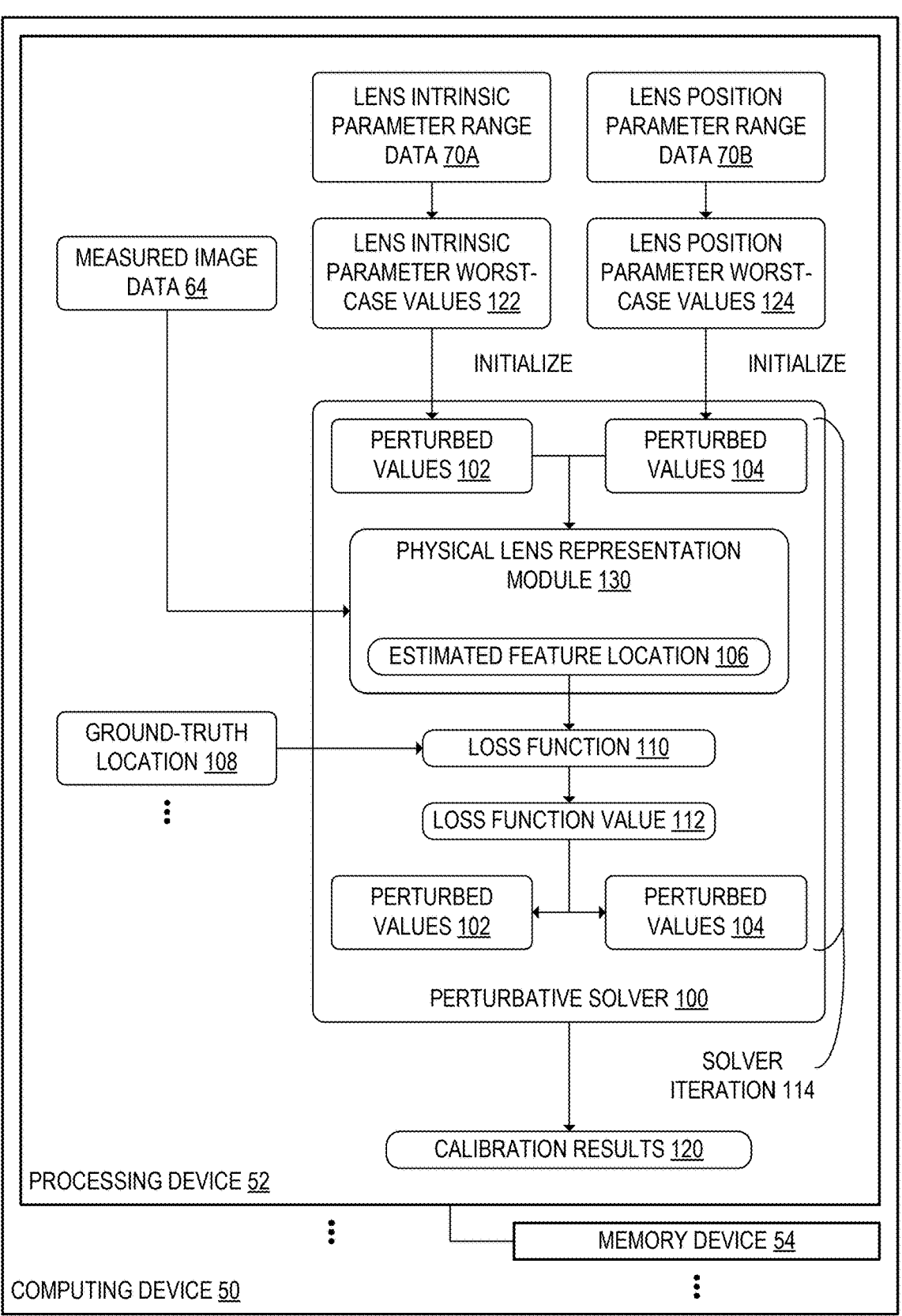
FIG. 5 schematically shows the computing device when one or more processing devices are configured to compute calibration results by executing a perturbative solver, according to the example of FIG. 3.

FIG. 5 schematically shows the computing device 50 when the one or more processing devices 52 are configured to compute calibration results 120 by executing a perturbative solver 100. The perturbative solver 100 is configured to receive the measured image data 64 as an input. As another input, the perturbative solver 100 is configured to receive one or more ground-truth locations 108 of the one or more ground-truth features 42 in 3D space. The perturbative solver 100 may, for example, execute a limited-memory Broyden-Fletcher-Goldfarb-Shanno box (L-BFGS-B) algorithm. In other examples, some other perturbative solver algorithm may be used.

The perturbative solver 100 is configured to iteratively compute respective perturbed values 102 and 104 of the intrinsic lens parameters 80 and the lens position parameters 90 over a plurality of solver iterations 114. The perturbed values 102 and 104 are computed based at least in part on the lens tolerance range data 70. The one or more processing devices 52 may be configured to compute a plurality of lens intrinsic parameter worst-case values 122 based on the lens intrinsic parameter range data 70A by setting the intrinsic lens parameters 80 to extremal values of the intrinsic parameter ranges. In addition, the one or more processing devices 52 may be configured to compute a plurality of lens position parameter worst-case values 124 based on the lens position parameter range data 70B by setting the lens position parameters 90 to extremal values of the position parameter ranges. The one or more processing devices 52 may be further configured to initialize the perturbed values 102 as the lens intrinsic parameter worst-case values 122 and initialize the perturbed values 104 as the lens position parameter worst-case values 124.

In each of the solver iterations 114, the one or more processing devices 52 are configured to compute one or more estimated feature locations 106 of the one or more ground-truth features 42 based at least in part on the measured image data 64 and the perturbed values 102 and 104. The estimated feature location 106 is computed at a physical lens representation module 130, which is discussed in further detail below.

In each of the solver iterations 114, the one or more processing devices 52 are further configured to compute a value 112 of a loss function 110 based at least in part on the one or more estimated feature locations 106 and the one or more respective ground-truth locations 108 of the one or more ground-truth feature 42. The one or more processing devices 52 are accordingly configured to determine how accurately the estimated feature location 106 matches the ground-truth location 108.

The one or more processing devices 52 are further configured to update the perturbed values 102 and 104 based at least in part on the value 112 of the loss function 110. The perturbed values 102 and 104 are updated according to the specific perturbative algorithm executed at the perturbative solver 100. The one or more processing devices 52 may be configured to further update the perturbed values 102 and 104 in a subsequent solver iteration 114.

The one or more processing devices 52 are further configured to output, as the calibration results 120, the perturbed values 102 and 104 computed in a final solver iteration 114 of the plurality of solver iterations 114. Accordingly, the perturbative solver 100 is configured to approximate values of the intrinsic lens parameters 80 and the lens position parameters 90 within the ranges specified by the lens tolerance range data 70.

Figure 6:
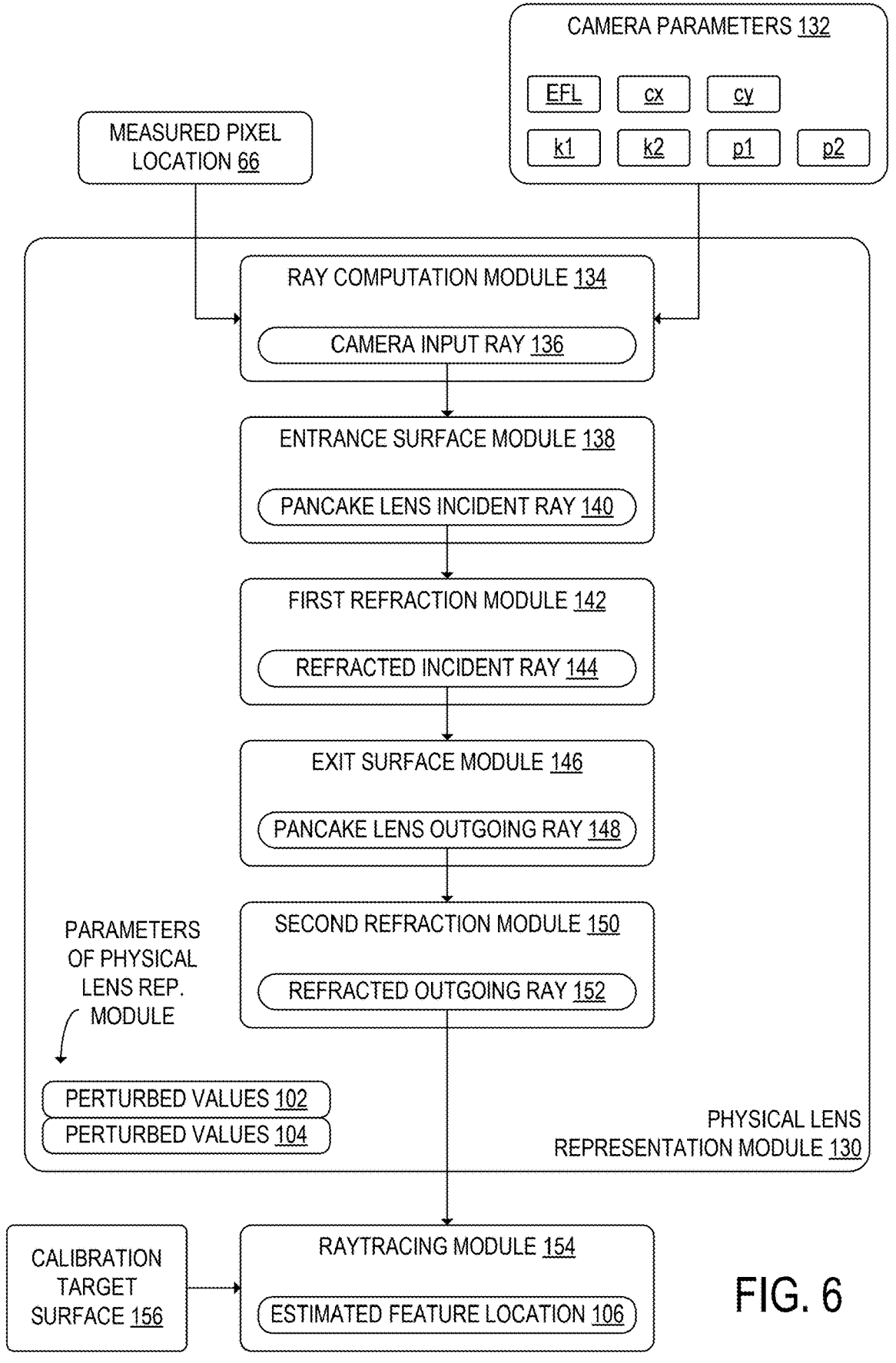
FIG. 6 schematically shows a physical lens representation module at which an estimated feature location is computed, according to the example of FIG. 5.

FIG. 6 schematically shows the physical lens representation module 130 in additional detail during computation of an estimated feature location 106, according to one example. The physical lens representation module 130 is parametrized by the perturbed values 102 and 104 of the intrinsic lens parameters 80 and the lens position parameters 90. Thus, the perturbed values 102 and 104 are used as estimates of the physical parameters of the pancake lens 36 with which the one or more processing devices 52 are configured to compute the one or more estimated feature locations 106.

The physical lens representation module 130 is configured to receive, as input, a measured pixel location 66 included in the measured image data 64. The physical lens representation module 130 is further configured to process the measured pixel location 66 at a sequence of sub-modules to compute a refracted outgoing ray 152. The one or more processing devices 52 are further configured to compute the estimated feature location 106 by tracing the refracted outgoing ray 152 to a calibration target surface 156 of the calibration target 40.

The following equation shows the sequence of sub-modules included in the physical lens representation module 130:

$$F_{phys} = f_{refract2} f_{exitsurf} f_{refract1} f_{entrancesurf} f_{ET\_cam}(im_x, im_y)$$

In the above equation, $f_{ET\_cam}$ is a function implemented by a ray computation module 134, $f_{entrancesurf}$ is a function implemented by an entrance surface module 138, $f_{refract1}$ is a function implemented by a first refraction module 142, $f_{exitsurf}$ is a function implemented by an exit surface module

146, and $f_{refract2}$ is a function implemented by a second refraction module 150. These modules are each discussed in further detail below.

At the ray computation module 134, the one or more processing devices 52 are configured to receive the measured pixel location 66. The ray computation module 134 is further configured to receive a plurality of camera parameters 132 of the eye-tracking camera 34. The camera parameters 132 may include an effective focal length EFL, a center x coordinate cx, a center y coordinate cy, and distortion parameters k1, k2, p1, and p2.

At the ray computation module 134, the one or more processing devices 52 are configured to compute a camera input ray 136 based at least in part on the measured pixel location 66 and the camera parameters 132. The camera input ray 136 is a ray between the surface of the eye-tracking camera 34 and the inward-facing surface of the pancake lens 36. The ray computation module 134 is further configured to output the camera input ray 136 to the entrance surface module 138.

At the entrance surface module 138, the one or more processing devices 52 are configured to receive the camera input ray 136. Based at least in part on the camera input ray 136, the one or more processing devices 52 are further configured to compute a pancake lens incident ray 140.

At the first refraction module 142, the one or more processing devices 52 are further configured to receive the pancake lens incident ray 140. The one or more processing devices 52 are further configured to compute a refracted incident ray 144 based at least in part on the pancake lens incident ray 140 and to output the refracted incident ray 144.

At the exit surface module 146, the one or more processing devices 52 are further configured to receive the refracted incident ray 144. Based at least in part on the refracted incident ray 144, the one or more processing devices 52 are further configured to compute a pancake lens outgoing ray 148. The one or more processing devices 52 are further configured to output the pancake lens outgoing ray 148.

At the second refraction module 150, the one or more processing devices 52 are further configured to receive the pancake lens outgoing ray 148. Based at least in part on the pancake lens outgoing ray 148, the one or more processing devices 52 are further configured to compute a refracted outgoing ray 152. The one or more processing devices 52 are further configured to output the refracted outgoing ray 152 to a raytracing module 154.

At the raytracing module 154, the one or more processing devices 52 are further configured to compute the estimated feature location 106 by tracing the refracted outgoing ray 152 to a calibration target surface 156 of the calibration target 40. The one or more processing devices 52 may accordingly be configured to compute the estimated feature location 106 that is compared to the ground-truth location 108 of the ground-truth feature 42 at the perturbative solver 100, as discussed above with reference to FIG. 5.

Figure 7A:
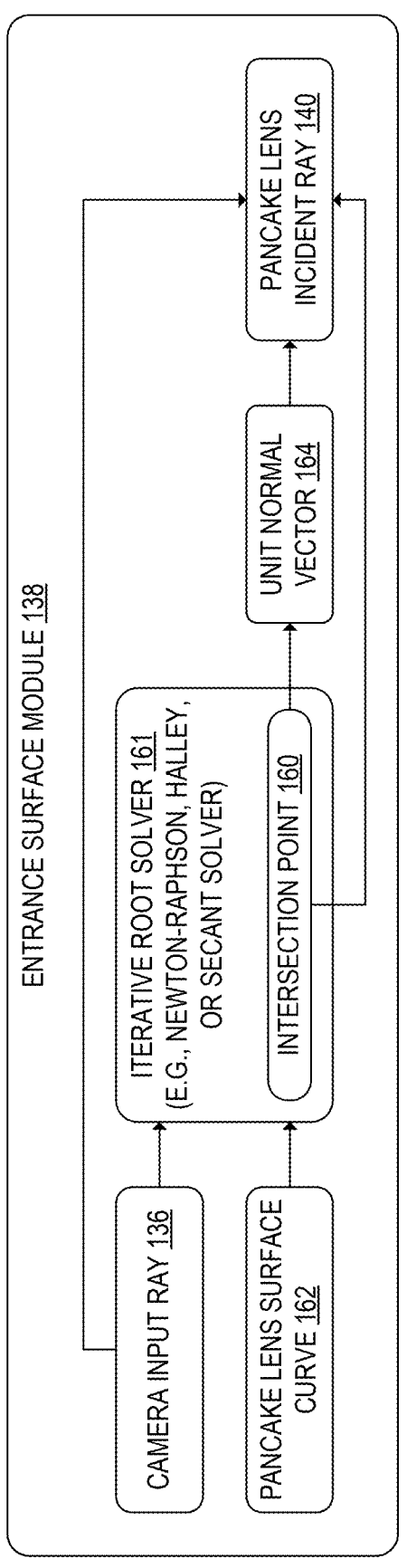
FIG. 7A schematically shows an entrance surface module included in the physical lens representation module, according to the example of FIG. 6.
Figure 7B:
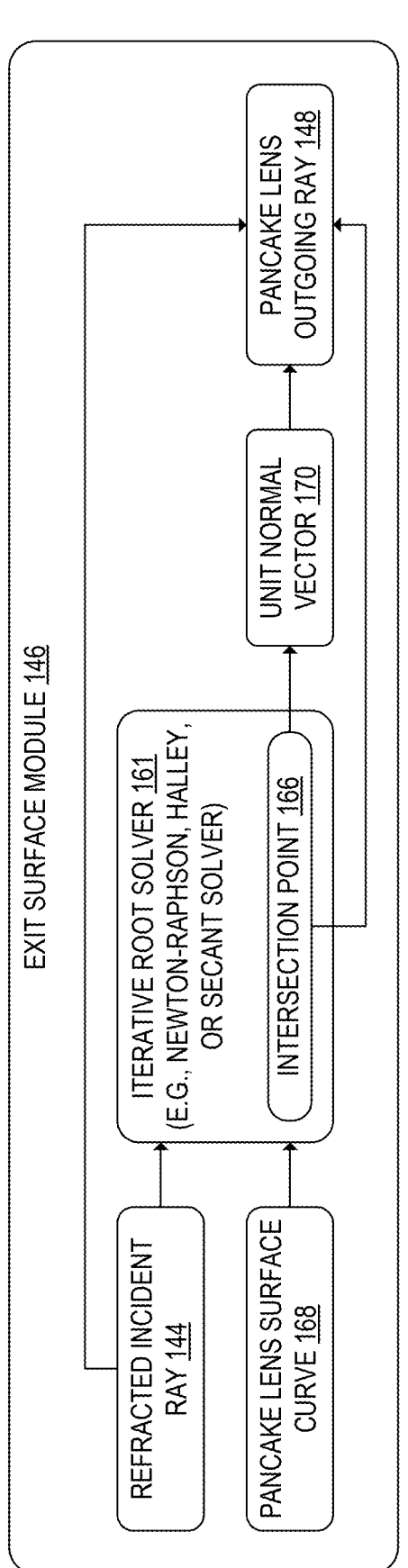
FIG. 7B schematically shows an exit surface module included in the physical lens representation module, according to the example of FIG. 6.

FIG. 7A schematically shows the entrance surface module 138 in additional detail. In addition, FIG. 7B schematically shows the exit surface module 146 in additional detail. As discussed in further detail below, the entrance surface module 138 and the exit surface module 146 both include an iterative root finder 161.

Subsequently to receiving the camera input ray 136, the one or more processing devices 52 are configured to compute an intersection point 160 at the entrance surface module 138. The camera input ray 136, as computed at the ray computation module 134, may be represented as follows at the entrance surface module 138:

$$p_{line} = p_{in} + t * \vec{v}_{inc}$$

In the above equation, $p_{in}$ is the measured pixel location 66, $\tilde{v}_{inc}$ is the direction of the camera input ray 136, and t is time.

The entrance surface module 138 may further utilize a pancake lens surface curve 162 of an incident surface of the pancake lens 36 when computing the pancake lens incident ray 140. The pancake lens surface curve 162 may be expressed using the following equation:

$$Z(s) = \frac{Cs^2}{1 + \sqrt{1 - (1+k)C^2 s^2}} + \sum_{n=2}^{M} A_{2n} s^{2n}$$

In the above equation, C is a surface curvature of the pancake lens 36, k is a surface conic constant of the pancake lens 36, $A_{2n}$ are the coefficients of higher-order lens terms (n=2, 3, 4, . . . ), and s is a radial coordinate defined by $s^2 = x^2 + y^2$.

The following position function may be used to indicate locations within the pancake lens 36:

$$Q(s, z) = z - \left( \frac{Cs^2}{1 + \sqrt{1 - (1+k)C^2 s^2}} + \sum_{n=2}^{M} A_{2n} s^{2n} \right)$$

In the above equation, z is a distance along an axis of the pancake lens 36.

Rays in 3D space may be represented as follows:

$$p = p_{in} + t \cdot v_{inc}$$

In the above equation, the variables are defined as follows:

$$p_{in} = (s_0, z_0)$$
$$s_0^2 = x_0^2 + y_0^2$$
$$v_{inc} = (v_0, n_0)$$
$$v_0^2 = l_0^2 + m_0^2$$

These terms $n_0$, $l_0$, $m_0$, $x_0$, $y_0$, $z_0$ can be generated at the ray computation module 134 using camera configuration parameters.

The intersection point 160 occurs at a location at which Q(s,z)=0. The position function Q(s,z) may be decomposed into the following terms:

$$Q(s,z) = Q(t) = H(t) + D(t)$$

The term H(t) is defined as follows:

$$H(t) = \alpha t^2 + \beta t + \gamma$$
$$\alpha = \frac{v_0^2}{a^2} + \frac{n_0^2}{b^2}$$
$$a^2 = \frac{1}{(1+k)C^2}$$
$$b^2 = \frac{1}{((1+k)C)^2}$$
$$\beta = 2 * \left( \frac{\langle s_0, v_0 \rangle}{a^2} + \frac{(z_0 + b)n_0}{b^2} \right)$$
$$\langle s_0, v_0 \rangle = x_0 * l_0 + y_0 * m_0$$

-continued $$\gamma = \left( \frac{s_0^2}{a^2} + \frac{(z_0 + b)^2}{b^2 - 1} \right)$$
$$s_0^2 = x_0^2 + y_0^2$$

The term D(t) is defined as follows:

$$D(t) = \frac{(g^2 + 2g * (z_0 + b + n_0 * t))}{b^2}$$
$$g = \sum_{n=2}^{M} A_{2n} s^{2n}$$

When D=0, the position function Q(t) has an analytic solution where Q=H=0. The value of t at the analytic solution is indicated as to. In addition, t* indicates a global minimum that satisfies Q(t*)=0. In the range [t−d, t+d], where d=|t*−t_0|, $\|Q(t)\|^2$ is a concave function.

At the entrance surface module 138, the one or more processing devices 52 are configured to execute an iterative root solver 161 to compute t*. The iterative root solver may be selected from the group consisting of a Newton-Raphson solver, a Halley solver, and a secant solver. These iterative root finding approaches may identify t* in two to four iterations. Thus, the one or more processing devices 52 may efficiently compute global minimum of Q. In other examples, some other type of iterative root solver 161 may be used.

In examples in which the iterative root solver 161 is a Newton-Raphson solver, the following layered differentiable formula for a solver iteration may be used:

$$L_{newton-raphson}(t) = t - \frac{Q(t)}{Q'(t)}$$

In examples in which the iterative root solver is a Halley solver, the following layered differentiable formula may be used instead:

$$L_{halley}(t) = t - \frac{2Q(t)Q'(t)}{2[Q'(t)]^2 - Q(t)Q''(t)}$$

In examples in which a Newton-Raphson solver or a Halley solver is used, the physical lens representation module 130 may be expressed using the following equation:

$$F_{phys} = f_{refract2} \cdot f_{normal2} \cdot L^n \cdot f_{refract1} \cdot f_{normal1} \cdot L^n \cdot f_{ET\_cam} (im_x, im_y)$$

In the example equation shown above, $f_{normal1}$ and $f_{normal2}$ are used to calculate respective unit normal vectors given a point on a surface profile, as discussed in further detail below. In the above equation for the physical lens representation module 130, the derivative of the layered differentiable formula may be computed as follows:

$$\frac{\partial L^n}{\partial \theta} = \frac{\partial L^n}{\partial L^{n-1}} * \frac{\partial L^{n-1}}{\partial L^{n-2}} * \cdots * \frac{\partial L^2}{\partial L} * \frac{\partial L}{\partial \theta}$$

In this equation, θ is an arbitrary variable used to show the chain rule derivative of $L^n$.

Subsequently to computing the global minimum t*, the one or more processing devices 52 may be further configured to compute the intersection point 160 on the surface of the pancake lens 36 using the following formula:

$$p = p_{in} + t^* * v_{inc}$$

The one or more processing devices 52 are further configured to compute a unit normal vector 164 at the entrance surface module 138. A normal vector 164 may be computed using the derivatives of the position function Q:

$$\frac{dQ(s, z)}{ds} = 2s * \frac{dQ(s)}{ds^2}$$

$$\frac{dQ(s, z)}{dz} = 1$$

The one or more processing devices 52 may be configured to compute the normal vector as follows:

$$N(s, z) = \left( 2s * \frac{dQ(s)}{ds^2}, 1 \right)$$

The one or more processing devices 52 may be further configured to compute the unit normal vector 164 as:

$$\tilde{N}(s,z) = N/\|N\|$$

The input ray direction Vine of the camera input ray 136, the intersection point p with the surface of the pancake lens, and the unit normal vector $\tilde{N}$ together define the pancake lens incident ray 140 that is output to the first refraction module 142.

Returning to the example of FIG. 6, the one or more processing devices 52 may be configured to compute the refracted incident ray 144 using the pancake lens incident ray 140 and the refractive index of the pancake lens 36. The refracted incident ray 144 may be computed using the following formula:

$$\tilde{v}_{refract} = \gamma \tilde{v}_{inc} + (\gamma d - \sqrt{1 - \gamma^2(1 - d^2)})\tilde{N}$$

In the above equation, $\gamma$ is defined as:

$$\gamma = n_{inc}/n_{out}$$

where $n_{inc}$ is the refractive index of the initial material through which the ray travels, and where $n_{out}$ is the refractive index of the subsequent material. When the refracted incident ray 144 is computed, $\gamma = 1/n_{pancake}$, since the refracted incident ray 144 is incident from air to the pancake lens 36. In the above equation for the refracted incident ray 144, d is defined as:

$$d = -\langle \tilde{N}, \tilde{v}_{inc} \rangle$$

At the exit surface module 146 depicted in FIG. 7B, the one or more processing devices 52 are configured to receive the refracted incident ray 144 and a pancake lens surface curve 168 of an outgoing surface of the pancake lens 36. At the iterative root solver 161, the one or more processing devices 52 are further configured to compute an intersection point 166 between the pancake lens outgoing ray 148 and the outgoing surface of the pancake lens 36 using the refracted incident ray 144 and the pancake lens surface curve 168 as input. The intersection point 166 may be computed using the approach discussed above with reference to FIG. 7A. The one or more processing devices 52 may be further configured to compute a unit normal vector 170 of the pancake lens outgoing ray 148 using the approach discussed above with which the unit normal vector 164 of FIG. 7A may be computed. Thus, the pancake lens outgoing ray 148 includes the direction of the refracted incident ray 144, the intersection point 166, and the unit normal vector 170.

The one or more processing devices 52 are further configured to compute the refracted outgoing ray 152 at the second refraction module 150 using the equation for $\tilde{v}_{refract}$ discussed above, but with the refracted incident ray 144, the intersection point 166, the unit normal vector 170, and the refractive index of the pancake lens 36 as inputs. At the second refraction module 150, $\gamma = n_{pancake}$, since the refracted outgoing ray 152 is incident from the pancake lens 36 to air.

Figure 8A:
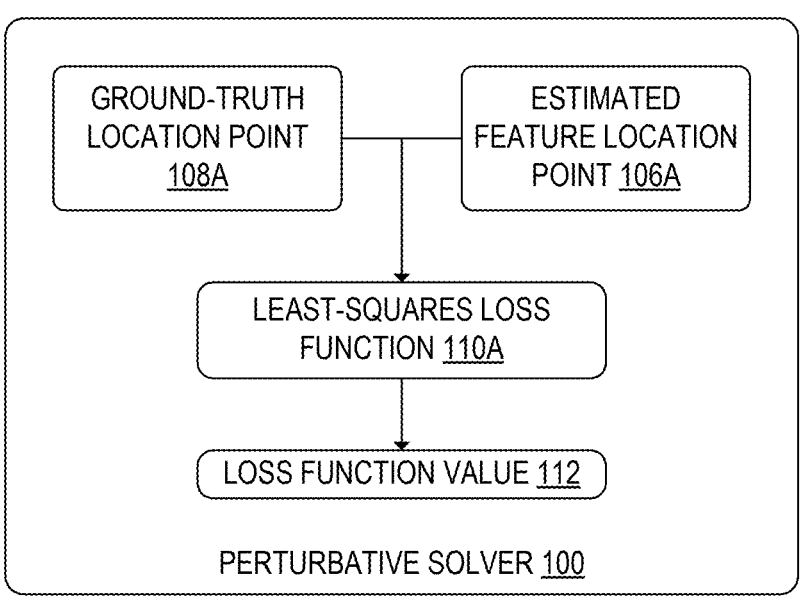
FIG. 8A schematically shows the perturbative solver in an example in which the one or more processing devices are configured to compute a value of a least-squares loss function, according to the example of FIG. 5.
Figure 8B:
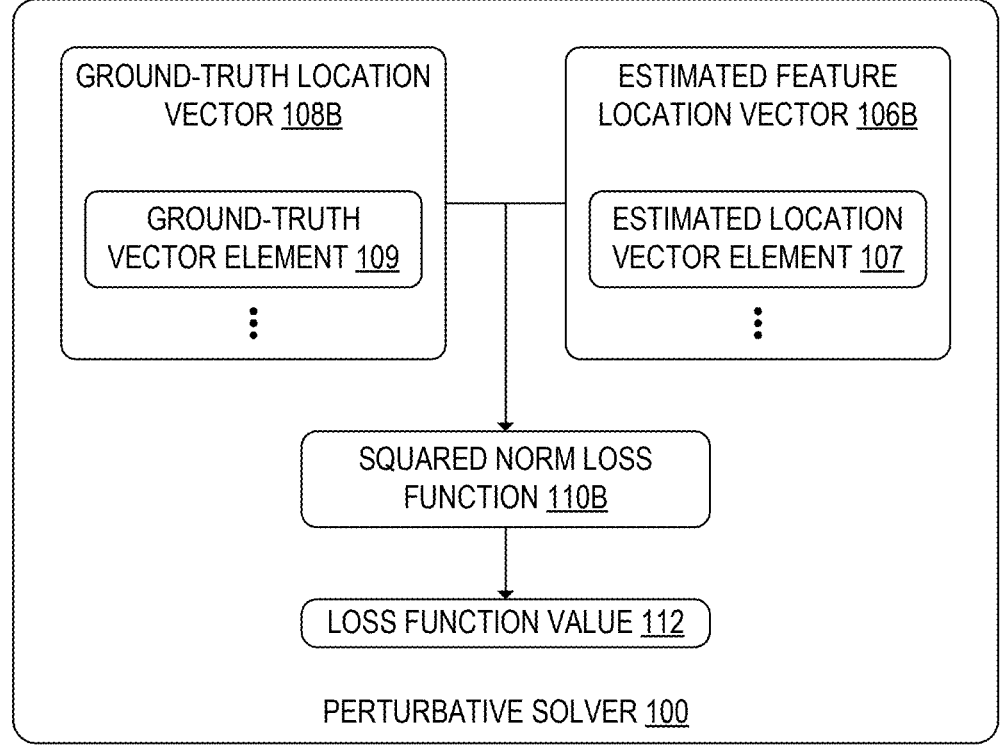
FIG. 8B schematically shows the perturbative solver in an example in which the one or more processing devices are configured to compute a value of a squared norm loss function, according to the example of FIG. 5.
Figure 8C:
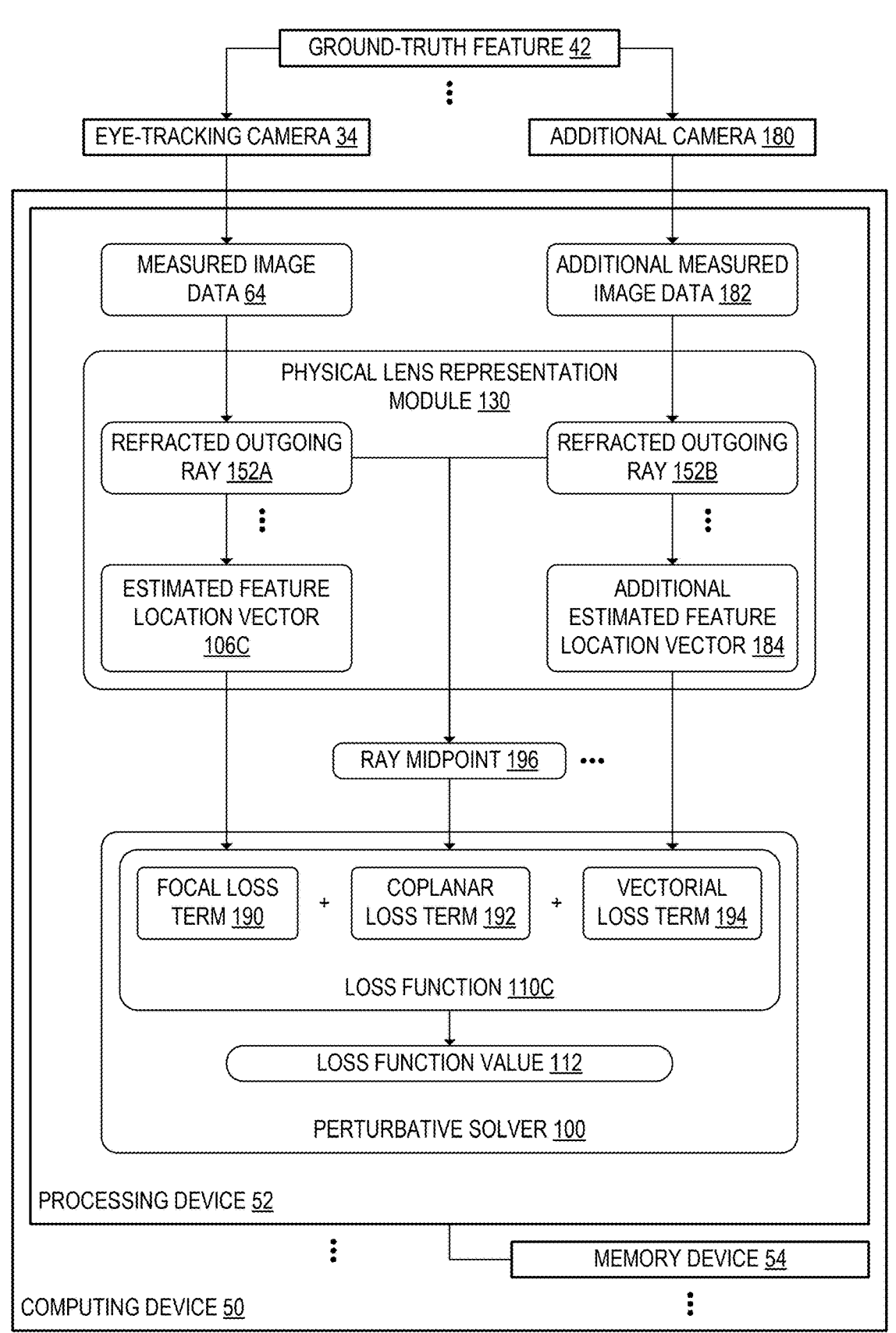
FIG. 8C schematically shows the computing device in an example in which the one or more processing devices are further configured to receive additional measured image data of ground-truth features from an additional camera, according to the example of FIG. 5.

Returning to FIG. 5, as discussed above, a loss function 110 is used when checking the accuracy of the one or more estimated feature locations 106. FIGS. 8A-8C schematically show the perturbative solver 100 in examples in which different loss functions 110 are used. In the example of FIG. 8A, the one or more processing devices 52 are configured to receive the ground-truth location 108 as a ground-truth location point 108A and compute the estimated feature location 106 as an estimated feature location point 106A, which are both points in 3D space. The one or more processing devices 52 are further configured to compute the value 112 of the loss function 110 as a least-squares loss function 110A between the estimated feature location point 106A and the ground-truth location point 108A. Thus, in the example of FIG. 8A, the loss function 110 is computed for a single pair of points.

In the example of FIG. 8B, the one or more processing devices 52 are configured to receive a ground-truth location vector 108B including a plurality of the ground-truth locations 108 expressed as ground-truth location vector elements 109. The one or more processing devices 52 are further configured to compute an estimated feature location vector 106B including a plurality of the estimated feature locations 106 expressed as estimated location vector elements 107. The ground-truth vector elements 109 correspond to locations of the ground-truth features 42 in 3D space, and the estimated location vector elements 107 are estimates of the locations of those ground-truth features 42 in 3D space.

In the example of FIG. 8B, the one or more processing devices 52 are further configured to compute the value 112 of the loss function 110 as a squared norm 110B between the ground-truth location vector 108B and the estimated feature location vector 106B. The norm may be an L1 norm or an L2 norm, which is then squared to obtain the squared norm loss function 110B.

FIG. 8C schematically shows the computing device 50 in an example in which the one or more processing devices 52 are further configured to receive additional measured image data 182 of a plurality of the ground-truth features 42 from an additional camera 180. The additional camera 180 may be a camera included in the HMD device 10, such as another eye-tracking camera 34. Alternatively, the additional camera 180 may be external to the HMD device 10.

In the example of FIG. 8C, the one or more processing devices 52 are configured to compute an estimated feature location vector 106C including a plurality of the estimated feature locations 106, as in the example of FIG. 8B. The one or more processing devices 52 are further configured to compute an additional estimated feature location vector 184 based at least in part on the additional measured image data 182. The estimated feature location vector 106C and the additional estimated feature location vector 184 are both computed at the physical lens representation module 130.

The one or more processing devices 52 are further configured to compute the value 112 of a loss function 110C based at least in part on the estimated feature location vector 106C and the additional estimated feature location vector 184. In the example of FIG. 5D, the one or more processing devices 52 are configured to compute the value 112 of the loss function 110C as a sum of a focal loss term 190, a coplanar loss term 192, and a vectorial loss term 194. Details of the computation of these loss terms are discussed below. When calculating an intersection of a bundle of lines that do not precisely intersect at a point, the focal loss is the focal loss is the root mean square distance between an approximate intersection point and the lines. When fitting a plane to a given a bundle of points, there can be fitting errors because the points are not perfectly on a plane, and the planar loss refers to the root mean square normal distance between the points and the fitted plane. When the points are fitted to a chessboard pattern as a calibration target 40, the spacing among the fitted points is not perfectly aligned with the spacing of chessboard pattern, thereby resulting in vectorial loss.

When computing the loss function 110C of FIG. 8C, the one or more processing devices 52 are configured to compute respective refracted outgoing rays 152A and 152B using the measured image data 64 and the additional measured image data 182 at the physical lens representation module 130. The one or more processing devices 52 are further configured to compute a plurality of ray midpoints 196 between respective pairs of the refracted outgoing rays 152A and 152B corresponding to the same ground-truth features 42. A ray midpoint 196 is a point equidistant between the closest-together points along the refracted outgoing rays 152A and 152B. The one or more processing devices 52 may be further configured to compute the focal loss term 190 as a sum, over the plurality of ray midpoints, of respective squared distances between those ray midpoints 196 and their corresponding refracted outgoing rays 152A and 152B. Thus, the focal loss term 190 decreases as the refracted outgoing rays 152A and 152B become closer together at their points of closest approach.

The plurality of ray midpoints 196 computed for the pairs of refracted outgoing rays 152A and 152B may approximately lie on a plane. The coplanar loss term 192 may be computed as a plane fitting error for the plurality of ray midpoints 196. For example, the plane fitting error may be computed as a least-squares error for a plane of best fit.

The one or more processing devices 52 may be configured to compute the vectorial loss term 194 as a squared norm between the estimated feature location vector 106C and the additional estimated feature location vector 184. As in the example of FIG. 8B, the norm may be an L1 or L2 norm.

Figure 9:
FIG. 9 schematically shows the computing system when the one or more processing devices are further configured to store the calibration results in HMD device memory included in the HMD device, according to the example of FIG. 5.

FIG. 9 schematically shows the computing system 1 when the one or more processing devices 52 are further configured to store the calibration results 120 in the HMD device memory 24 included in the HMD device 10. As shown in the example of FIG. 9, the one or more processing devices 52 are configured to transmit the calibration results 120 to the HMD device 10 subsequently to performing calibration. The HMD device processor 22 included in the HMD device 10 is configured to receive eye tracking data 200 at the eye-tracking camera 34. In the example of FIG. 9, the HMD device 10 includes a first eye-tracking camera 34A and a second eye-tracking camera 34B, as in the example of FIG. 1, that are respectively configured to collect first eye-tracking data 202 and second eye-tracking data 204.

The HMD device processor 22 is further configured to compute a gaze direction 206 of a user based at least in part on the eye tracking data 200 and the calibration results 120. Accordingly, the HMD device processor 22 is configured to use the calibration results 120 as parameters of a gaze tracking process that maps the eye tracking data 200 to the user's gaze direction 206 based at least in part on the values of the intrinsic lens parameters 80 and the lens position parameters 90 computed during calibration.

The HMD device processor 22 is further configured to output the gaze direction 206 to an additional computing process 208. For example, the additional computing process may be a user input process that uses the gaze direction 206 as a form of user input. As another example, the additional computing process 208 may be a mixed-reality object display process that is configured to compute displayed properties of one or more virtual objects, such that those virtual objects have specific apparent locations in the user's physical environment.

The following tables show experimental results for the calibration techniques discussed above. The table presented below shows the lens tolerance range data 70 of the intrinsic lens parameters 80 and the lens position parameters 90. Respective lens tolerance range data 70 is show for the approaches of FIGS. 8A-8C. In this example, a chessboard pattern was used as the calibration target 40. This calibration target 40 had corners with 4×4 mm spacing and an eye relief distance of 12 mm.

| Method | Pancake radius | Pancake conic & A2n | Pancake thickness & refractive index | Extrinsic, ET camera | Extrinsic, chessboard |
|---|---|---|---|---|---|
| Method 1: L2 distance | ±10 μm | ±2.5% | Thickness ± 25 μm | T: ±0.5 mm | T: ±0.5 mm |
| | | | n = 1.5372 | R: ±0.25° | R: ±0.5° |
| Method 2: vectorial | ±10 μm | ±2.5% | Thickness ± 25 μm | T: ±0.5 mm | tz: ±0.5 mm |
| | | | n = 1.5372 | R: ±0.25° | R: ±0.5° |
| Method 3: dual cam | ±10 μm | ±2.5% | Thickness ± 25 μm | T: ±0.5 mm | N/A |
| | | | n = 1.5372 | R: ±0.25° | N/A |

Using the calibration techniques discussed above, the physical parameters of the pancake lens 36, including the intrinsic lens parameters 80 and the lens position parameters 90, were reconstructed. The techniques of FIGS. 8A-8C were compared to a prior-art polynomial modeling approach. The following table shows the reconstruction error for the physical parameters obtained using each of these techniques.

| Reconstruction error of physical parameters | Method 1 (distance) 6-o-clock (L) & nasal (R) | Method 2 (vectorial) 6-o-clock (L) & nasal (R) | Method 3 (dual cameras) 6-o-clock (L) & nasal (R) | Non-physical model (poly-nomial) |
|---|---|---|---|---|
| Camera R (°) | 0.046, 0.043 | 0.01, 0.049 | 0.005, 0.007 | 0.25 |
| Camera T (μm) | 31, 15 | 5, 29 | 3, 6 | 500 |
| Lens thickness (μm) | 21.3, 24.7 | 15, 25 | 15.8 | 25 |
| Lens radius (μm) | 7.75, 4.2 | 9.4, 9.1 | 7.5 | 10 |
| Lens conic constant (%) | 0.96, 1.16 | 0.61, 0.72 | 0.81 | 2.5 |
| Lens higher-order terms (%) | 1.61, 1.38 | 2.03, 1.61 | 1.96 | 2.25 |

The following table shows the reprojection error in space for each of the above calibration approaches. The calibration target 40 used to obtain these reprojection error values was imaged at distances of 15, 18, 21, and 24 mm. The calibration target 40 was a chessboard pattern that had corners with 2×2 mm spacing. The reprojection error in the predictions of the four approaches was tested in three dimensions and was measured as a root mean squared (RMS) error.

| Reprojection error | Method 1: L2 loss | Method 2: vectorial loss | Method 3: two cameras | Non-physical model (polynomial) |
|---|---|---|---|---|
| 6-o-clock RMS error (μm) | 30 | 15 | 15 | 42 |
| Nasal RMS error (μm) | 50 | 36 | 15 | 90 |

As shown in the experimental results summarized in the above tables, the approaches of FIGS. 8A-8C achieve lower error than the polynomial model approach in both physical parameter reconstruction and reprojection. The techniques discussed above therefore allow the eye-tracking cameras 34 of the HMD device 10 to be calibrated more accurately.

The calibration techniques discussed above further allow dynamic distortion compensation (DDC) and dynamic color compensation (DCC) to be performed. These techniques may be used to increase the sharpness of images displayed on the display 12 of the HMD device 10, thereby allowing a lower pixel count to be used in the display 12 while maintaining image quality. In addition, DDC may reduce the likelihood that the user of the HMD device 10 experiences nausea. DDC and DCC both use estimates of lens parameters as input. The calibration techniques discussed above compute lens parameters that may be used as inputs to DDC and/or DCC, whereas existing black-box methods are unable to compute such parameter values.

FIG. 10A shows a flowchart of a method 300 of calibrating an eye-tracking camera that is included in an HMD device between a pancake lens and a display panel. The method 300 includes, at step 302, receiving lens tolerance range data associated with a plurality of intrinsic lens parameters of the pancake lens and with a plurality of lens position parameters of the pancake lens. For example, the intrinsic lens parameters may include a radius, a conic constant, a thickness, and a refractive index of the pancake lens. The lens position parameters may include a distance and an angle between the pancake lens and the eye-tracking camera. In addition, the lens position parameters may include one or more respective distances and angles between the pancake lens and one or more ground-truth features. The ground-truth features, in such examples, are located on a calibration target.

At step 304, the method 300 further includes receiving measured image data of the one or more ground-truth features on the calibration target. The measured image data may include, for each of the one or more ground-truth features, a respective measured pixel location in a pixel array.

At step 306, the method 300 further includes computing calibration results as respective estimated values of the intrinsic lens parameters and the lens position parameters over a plurality of solver iterations. The calibration results are computed at a perturbative solver.

At step 308, each of the solver iterations performed during step 306 includes computing one or more estimated feature locations based at least in part on the measured image data and on respective perturbed values of the intrinsic lens parameters and the lens position parameters. The perturbed values are computed based at least in part on the lens tolerance range data. For example, the perturbed values may be constrained to values located within the tolerance ranges of the intrinsic lens parameters and the lens position parameters. The perturbed values may be initialized as extremal values of the tolerance ranges in a first solver iteration.

At step 310, during each of the solver iterations, step 306 further includes computing a value of a loss function based at least in part on the one or more estimated feature locations and one or more respective ground-truth locations of the one or more ground-truth features. The perturbative solver may accordingly compare the estimated feature locations to the ground-truth locations.

At step 312, during each of the solver iterations, step 306 further includes updating the perturbed values based at least in part on the value of the loss function. The updated perturbed values may be used to compute another estimated feature location in a subsequent solver iteration.

At step 314, the method 300 further includes outputting, as the calibration results, the perturbed values computed in a final solver iteration of the plurality of solver iterations. Thus, the calibration results are output as the results of iteratively approximating the intrinsic lens parameters and the lens position parameters.

FIG. 10B shows additional steps that may be performed at the perturbative solver to compute the value of the loss function. Three different example approaches are shown in FIG. 10B. At step 316, according to a first approach, step 310 may include computing the value of the loss function as a least-squares loss function between an estimated feature location and a ground-truth location.

At step 318, according to a second approach, the method 300 may further include receiving a ground-truth location vector including a plurality of the ground-truth locations. At step 320, the method 300 may further include computing an estimated feature location vector including a plurality of the estimated feature locations. At step 322, computing the value of the loss function at step 310 may include computing the value of the loss function as a squared norm between the ground-truth location vector and the estimated feature location vector. The norm may, for example, be an L1 or L2 norm.

At step 324, according to a third approach, the method 300 may further include receiving additional measured image data of a plurality of the ground-truth features from an additional camera. At step 326, the method 300 may further include computing an estimated feature location vector including a plurality of the estimated feature locations. At step 328, the method 300 may further include computing an additional estimated feature location vector based at least in part on the additional measured image data. At step 330, computing the value of the loss function at step 310 may include computing the value of the loss function based at least in part on the estimated feature location vector and the additional estimated feature location vector. For example, at step 332, step 330 may include computing the value of the loss function as a sum of a focal loss term, a coplanar loss term, and a vectorial loss term that are each computed between the estimated feature location vector and the additional estimated feature location vector.

FIG. 10C shows additional steps of the method 300 that may be performed at step 308 to compute an estimated feature location of the one or more estimated feature locations. At step 334, step 308 may include inputting, into a physical lens representation module, a measured pixel location included in the measured image data. The measured pixel location is associated with a ground-truth feature in the example of FIG. 10C. In addition, the physical lens representation module is parametrized by the perturbed values of the intrinsic lens parameters and the lens position parameters, such that modifying the perturbed values during a solver iteration affects the value of the estimated feature location.

Steps 336 and 338 may be performed at a ray computation module included in the physical lens representation module. At step 336, step 308 may further include receiving the measured pixel location and a plurality of camera parameters of the eye-tracking camera. For example, the camera parameters may include an effective focal length, a center x coordinate, a center y coordinate, and distortion parameters. At step 338, step 308 may further include computing a camera input ray based at least in part on the measured pixel location and the camera parameters.

Step 340 may be performed at an entrance surface module included in the physical lens representation module. At step 340, step 308 may further include computing a pancake lens incident ray based at least in part on the camera input ray. In some examples, step 340 may include, at step 342, executing an iterative root solver selected from the group consisting of a Newton-Raphson solver, a Halley solver, and a secant solver. The iterative root solver may be used to compute an intersection point of the pancake lens incident ray with the surface of the pancake lens.

Step 344 may be performed at a first refraction module included in the physical lens representation module. At step 344, step 308 may further include computing a refracted incident ray based at least in part on the pancake lens incident ray.

Step 346 may be performed at an exit surface module included in the physical lens representation module. At step 346, step 308 may further include computing a pancake lens outgoing ray based at least in part on the refracted incident ray. In examples in which step 342 is performed, the iterative root solver may also be executed at step 346 during computation of the pancake lens outgoing ray.

Step 348 may be performed at a second refraction module included in the physical lens representation module. At step 348, step 308 may further include computing a refracted outgoing ray based at least in part on the pancake lens outgoing ray.

At step 350, step 308 may further include tracing the refracted outgoing ray to a calibration target surface of the calibration target to compute the estimated feature location.

FIG. 10D shows additional steps of the method 300 that may be performed in some examples subsequently to computing the calibration results at step 314. At step 352, the method 300 may further include storing the calibration results in HMD device memory included in the HMD device. Steps 354, 356, and 358 may be performed at an HMD device processor included in the HMD device. At step 354, the method 300 may further include receiving eye tracking data at the eye-tracking camera.

At step 356, the method 300 may further include computing a gaze direction of a user based at least in part on the eye tracking data and the calibration results. In some examples, the HMD device may include multiple eye-tracking cameras (e.g., a left eye-tracking camera and a right eye-tracking camera). In such examples, eye tracking data from the plurality of eye-tracking cameras may be received at the HMD device processor and used to compute the gaze direction of the user. At step 358, the method 300 may further include outputting the gaze direction to an additional computing process, such as a user input process or a mixed-reality object display process.

The methods and processes described herein are tied to a computing system of one or more computing devices. In particular, such methods and processes can be implemented as a computer-application program or service, an application-programming interface (API), a library, and/or other computer-program product.

FIG. 11 schematically shows a non-limiting embodiment of a computing system 400 that can enact one or more of the methods and processes described above. Computing system 400 is shown in simplified form. Computing system 400 may embody the computing system 1 described above and illustrated in FIGS. 3 and 9. Components of computing system 400 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 400 includes processing circuitry 402, volatile memory 404, and a non-volatile storage device 406. Computing system 400 may optionally include a display subsystem 408, input subsystem 410, communication subsystem 412, and/or other components not shown in FIG. 11.

Processing circuitry 402 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 402 may be single-core or multi-core, and the instructions executed thereon may be configured for sequential, parallel, and/or distributed processing. Individual components of the processing circuitry 402 optionally may be distributed among two or more separate devices, which may be remotely located and/or configured for coordinated processing. For example, aspects of the computing system 400 disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 402.

Non-volatile storage device 406 includes one or more physical devices configured to hold instructions executable by the processing circuitry 402 to implement the methods and processes described herein. When such methods and processes are implemented, the state of non-volatile storage device 406 may be transformed—e.g., to hold different data.

Non-volatile storage device 406 may include physical devices that are removable and/or built in. Non-volatile storage device 406 may include optical memory, semiconductor memory, and/or magnetic memory, or other mass storage device technology. Non-volatile storage device 406 may include nonvolatile, dynamic, static, read/write, read-only, sequential-access, location-addressable, file-addressable, and/or content-addressable devices. Non-volatile storage device 406 is configured to hold instructions even when power is cut to the non-volatile storage device 406.

Volatile memory 404 may include physical devices that include random access memory. Volatile memory 404 is typically utilized by processing circuitry 402 to temporarily store information during processing of software instructions. Volatile memory 404 typically does not continue to store instructions when power is cut to the volatile memory 404.

Aspects of processing circuitry 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via processing circuitry 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device 406, and thus transform the state of the non-volatile storage device 406, the state of display subsystem 408 may likewise be transformed to visually represent changes in the underlying data. Display subsystem 408 may include one or more display devices utilizing virtually any type of technology. Such display devices may be combined with processing circuitry 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, camera, or microphone.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 400 to send and/or receive messages to and/or from other devices via a network such as the Internet.

The following paragraphs provide additional description of the subject matter of the present disclosure. According to one aspect of the present disclosure, a computing system is provided, including one or more processing devices configured to calibrate an eye-tracking camera included in a head-mounted display (HMD) device between a pancake lens and a display panel. Calibrating the eye-tracking camera includes receiving lens tolerance range data associated with a plurality of intrinsic lens parameters of the pancake lens and a plurality of lens position parameters of the pancake lens. Calibrating the eye-tracking camera further includes receiving measured image data of one or more ground-truth features on a calibration target. Over a plurality of solver iterations, calibrating the eye-tracking camera further includes computing calibration results as respective estimated values of the intrinsic lens parameters and the lens position parameters. In each of the solver iterations, the one or more processing devices are configured to compute one or more estimated feature locations based at least in part on the measured image data and on respective perturbed values of the intrinsic lens parameters and the lens position parameters. The perturbed values are computed based at least in part on the lens tolerance range data. In each of the solver iterations, the one or more processing devices are further configured to compute a value of a loss function based at least in part on the one or more estimated feature locations and one or more respective ground-truth locations of the one or more ground-truth features. In each of the solver iterations, the one or more processing devices are further configured to update the perturbed values based at least in part on the value of the loss function. Calibrating the eye-tracking camera further includes outputting, as the calibration results, the perturbed values computed in a final solver iteration of the plurality of solver iterations. The above features may have the technical effect of calibrating the eye-tracking camera in a manner that achieves high accuracy. The above features may also have the technical effect of computing physically interpretable lens parameter values that may be used in additional processes such as dynamic distortion compensation and dynamic color compensation.

According to this aspect, the intrinsic lens parameters may include a radius, a conic constant, a thickness, and a refractive index of the pancake lens. The above features may have the technical effect of specifying physically interpretable intrinsic parameters of the pancake lens as parameters that are estimated during calibration.

According to this aspect, the lens position parameters may include a distance and an angle between the pancake lens and the eye-tracking camera. The lens position parameters may further include one or more respective distances and angles between the pancake lens and the one or more ground-truth features. The above features may have the technical effect of specifying physically interpretable position parameters of the pancake lens as parameters that are estimated during calibration.

According to this aspect, the one or more processing devices may be configured to compute the value of the loss function as a least-squares loss function between an estimated feature location and a ground-truth location. The above features may have the technical effect of using the loss function to compute perturbed values that result in accurate estimation of the feature location.

According to this aspect, the one or more processing devices may be configured to receive a ground-truth location vector including a plurality of the ground-truth locations.

The one or more processing devices may be further configured to compute an estimated feature location vector including a plurality of the estimated feature locations. The one or more processing devices may be further configured to compute the value of the loss function as a squared norm between the ground-truth location vector and the estimated feature location vector. The above features may have the technical effect of using the loss function to compute perturbed values that result in accurate estimates across a plurality of different estimated feature locations.

According to this aspect, the one or more processing devices may be configured to receive additional measured image data of a plurality of the ground-truth features from an additional camera. The one or more processing devices may be further configured to compute an estimated feature location vector including a plurality of the estimated feature locations. The one or more processing devices may be further configured to compute an additional estimated feature location vector based at least in part on the additional measured image data. The one or more processing devices may be further configured to compute the value of the loss function based at least in part on the estimated feature location vector and the additional estimated feature location vector. The above features may have the technical effect of using the loss function to compute perturbed values that result in agreement between the estimated feature locations and the additional estimated feature locations.

According to this aspect, the one or more processing devices may be configured to compute the value of the loss function as a sum of a focal loss term, a coplanar loss term, and a vectorial loss term that are each computed between the estimated feature location vector and the additional estimated feature location vector. The above features may have the technical effect of using the loss function to compute perturbed values that result in similar bundles of rays computed using the measured image data and the additional measured image data.

According to this aspect, the one or more processing devices may be configured to compute each of the one or more estimated feature locations at least in part by inputting, into a physical lens representation module, a measured pixel location included in the measured image data. The physical lens representation module may be parametrized by the perturbed values of the intrinsic lens parameters and the lens position parameters. The above features may have the technical effect of computing the one or more estimated feature locations using physically interpretable pancake lens parameters.

According to this aspect, the physical lens representation module may include a ray computation module at which the one or more processing devices are configured to receive the measured pixel location and a plurality of camera parameters of the eye-tracking camera. At the physical lens representation module, the one or more processing devices may be further configured to compute a camera input ray based at least in part on the measured pixel location and the camera parameters. The one or more processing devices may be further configured to output the camera input ray. The above features may have the technical effect of approximating a ray that is incident on the eye-tracking camera.

According to this aspect, the physical lens representation module may further include an entrance surface module at which the one or more processing devices are configured to receive the camera input ray. At the entrance surface module, based at least in part on the camera input ray, the one or more processing devices may be further configured to compute a pancake lens incident ray. The one or more processing devices may be further configured to output the pancake lens incident ray. The above features may have the technical effect of approximating the pancake lens incident ray during computation of the estimated feature location.

According to this aspect, at the entrance surface module, the one or more processing devices may be configured to execute an iterative root solver selected from the group consisting of a Newton-Raphson solver, a Halley solver, and a secant solver. The above features may have the technical effect of iteratively solving for an intersection point between the camera input ray and the pancake lens.

According to this aspect, the physical lens representation module may further include a first refraction module at which the one or more processing devices are configured to receive the pancake lens incident ray. At the first refraction module, based at least in part on the pancake lens incident ray, the one or more processing devices may be further configured to compute a refracted incident ray. The one or more processing devices may be further configured to output the refracted incident ray. The above features may have the technical effect of approximating the refracted incident ray during computation of the estimated feature location.

According to this aspect, the physical lens representation module may further include an exit surface module at which the one or more processing devices are configured to receive the refracted incident ray. At the exit surface module, based at least in part on the refracted incident ray, the one or more processing devices may be further configured to compute a pancake lens outgoing ray. The one or more processing devices may be further configured to output the pancake lens outgoing ray. The above features may have the technical effect of approximating the pancake lens outgoing ray during computation of the estimated feature location.

According to this aspect, the physical lens representation module may further include a second refraction module at which the one or more processing devices are configured to receive the pancake lens outgoing ray. Based at least in part on the pancake lens outgoing ray, the one or more processing devices may be further configured to compute a refracted outgoing ray. The one or more processing devices may be further configured to compute the estimated feature location by tracing the refracted outgoing ray to a calibration target surface of the calibration target. The above features may have the technical effect of computing the estimated feature location by computing and performing raytracing on the refracted outgoing ray.

According to this aspect, the one or more processing devices may be further configured to store the calibration results in HMD device memory included in the HMD device. At an HMD device processor included in the HMD device, the one or more processing devices may be further configured to receive eye tracking data at the eye-tracking camera. At the HMD device processor, the one or more processing devices may be further configured to compute a gaze direction of a user based at least in part on the eye tracking data and the calibration results. The one or more processing devices may be further configured to output the gaze direction to an additional computing process. The above features may have the technical effect of using the calibration results with the eye-tracking camera at runtime to determine the gaze direction of the user.

According to another aspect of the present disclosure, a method is provided for calibrating an eye-tracking camera included in a head-mounted display (HMD) device between a pancake lens and a display panel. The method includes receiving lens tolerance range data associated with a plurality of intrinsic lens parameters of the pancake lens and a plurality of lens position parameters of the pancake lens. The method further includes receiving measured image data of one or more ground-truth features on a calibration target. Over a plurality of solver iterations, the method further includes computing calibration results as respective estimated values of the intrinsic lens parameters and the lens position parameters. Each of the solver iterations may include computing one or more estimated feature locations based at least in part on the measured image data and on respective perturbed values of the intrinsic lens parameters and the lens position parameters. The perturbed values may be computed based at least in part on the lens tolerance range data. Each of the solver iterations may further include computing a value of a loss function based at least in part on the one or more estimated feature locations and one or more respective ground-truth locations of the one or more ground-truth features. Each of the solver iterations may further include updating the perturbed values based at least in part on the value of the loss function. The method may further include outputting, as the calibration results, the perturbed values computed in a final solver iteration of the plurality of solver iterations. The above features may have the technical effect of calibrating the eye-tracking camera in a manner that achieves high accuracy. The above features may also have the technical effect of computing physically interpretable lens parameter values that may be used in additional processes such as dynamic distortion compensation and dynamic color compensation.

According to this aspect, the intrinsic lens parameters may include a radius, a conic constant, a thickness, and a refractive index of the pancake lens. The above features may have the technical effect of specifying physically interpretable intrinsic parameters of the pancake lens as parameters that are estimated during calibration.

According to this aspect, the lens position parameters may include a distance and an angle between the pancake lens and the eye-tracking camera. The lens position parameters may further include one or more respective distances and angles between the pancake lens and the one or more ground-truth features. The above features may have the technical effect of specifying physically interpretable position parameters of the pancake lens as parameters that are estimated during calibration.

According to this aspect, computing each of the one or more estimated feature locations may include inputting, into a physical lens representation module, a measured pixel location included in the measured image data. The physical lens representation module is parametrized by the perturbed values of the intrinsic lens parameters and the lens position parameters. The above features may have the technical effect of computing the one or more estimated feature locations using physically interpretable pancake lens parameters.

According to another aspect of the present disclosure, a computing system is provided, including one or more processing devices configured to calibrate an eye-tracking camera included in a head-mounted display (HMD) device between a pancake lens and a display panel. Calibrating the eye-tracking camera may include receiving lens tolerance range data associated with a plurality of intrinsic lens parameters of the pancake lens and a plurality of lens position parameters of the pancake lens. Calibrating the eye-tracking camera may further include receiving measured image data of one or more ground-truth features on a calibration target. Over a plurality of solver iterations, calibrating the eye-tracking camera may further include computing calibration results at least in part by iteratively recomputing respective perturbed values of the intrinsic lens parameters and the lens position parameters that are located with respective tolerance ranges included the lens tolerance range data. The one or more processing devices may be further configured to transmit to the HMD device, as the calibration results, the perturbed values computed in a final solver iteration of the plurality of solver iterations. The one or more processing devices may be further configured to store the calibration results in HMD device memory included in the HMD device. At an HMD device processor included in the HMD device, the one or more processing devices may be further configured to receive eye tracking data at the eye-tracking camera. At the HMD device processor, the one or more processing devices may be further configured to compute a gaze direction of a user based at least in part on the eye tracking data and the calibration results. At the HMD device processor, the one or more processing devices may be further configured to output the gaze direction to an additional computing process. The above features may have the technical effect of calibrating the eye-tracking camera in a manner that achieves high accuracy and estimates values of physically interpretable parameters of the pancake lens. The above features may also have the technical effect of using the calibration results with the eye-tracking camera at runtime to determine the gaze direction of the user.

"And/or" as used herein is defined as the inclusive or V, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing system comprising:
one or more processing devices configured to calibrate an eye-tracking camera included in a head-mounted display (HMD) device between a pancake lens and a display panel, wherein calibrating the eye-tracking camera includes:
receiving lens tolerance range data associated with:
a plurality of intrinsic lens parameters of the pancake lens; and
a plurality of lens position parameters of the pancake lens;
receiving measured image data of one or more ground-truth features on a calibration target;

over a plurality of solver iterations, computing calibration results as respective estimated values of the plurality of intrinsic lens parameters and the plurality of lens position parameters, wherein, in each of the solver iterations, the one or more processing devices are configured to:

compute one or more estimated feature locations based at least in part on the measured image data and on respective perturbed values of the plurality of intrinsic lens parameters and the plurality of lens position parameters, wherein the perturbed values are computed based at least in part on the lens tolerance range data;

compute a value of a loss function based at least in part on the one or more estimated feature locations and one or more respective ground-truth locations of the one or more ground-truth features; and update the perturbed values based at least in part on the value of the loss function; and outputting, as the calibration results, the perturbed values computed in a final solver iteration of the plurality of solver iterations.

2. The computing system of claim 1, wherein the plurality of intrinsic lens parameters include a radius, a conic constant, a thickness, and a refractive index of the pancake lens.

3. The computing system of claim 1, wherein the plurality of lens position parameters include:

a distance and an angle between the pancake lens and the eye-tracking camera; and one or more respective distances and angles between the pancake lens and the one or more ground-truth features.

4. The computing system of claim 1, wherein the one or more processing devices are configured to compute the value of the loss function as a least-squares loss function between an estimated feature location and a ground-truth location.

5. The computing system of claim 1, wherein the one or more processing devices are configured to:

receive a ground-truth location vector including a plurality of the ground-truth locations;

compute an estimated feature location vector including a plurality of the estimated feature locations; and compute the value of the loss function as a squared norm between the ground-truth location vector and the estimated feature location vector.

6. The computing system of claim 1, wherein the one or more processing devices are configured to:

receive additional measured image data of a plurality of the ground-truth features from an additional camera;

compute an estimated feature location vector including a plurality of the estimated feature locations; and compute an additional estimated feature location vector based at least in part on the additional measured image data; and compute the value of the loss function based at least in part on the estimated feature location vector and the additional estimated feature location vector.

7. The computing system of claim 6, wherein the one or more processing devices are configured to compute the value of the loss function as a sum of a focal loss term, a coplanar loss term, and a vectorial loss term that are each computed between the estimated feature location vector and the additional estimated feature location vector.

8. The computing system of claim 1, wherein:

the one or more processing devices are configured to compute each of the one or more estimated feature locations at least in part by inputting, into a physical lens representation module, a measured pixel location included in the measured image data; and the physical lens representation module is parametrized by the perturbed values of the plurality of intrinsic lens parameters and the plurality of lens position parameters.

9. The computing system of claim 8, wherein the physical lens representation module includes a ray computation module at which the one or more processing devices are configured to:

receive the measured pixel location and a plurality of camera parameters of the eye-tracking camera;

compute a camera input ray based at least in part on the measured pixel location and the camera parameters; and output the camera input ray.

10. The computing system of claim 9, wherein the physical lens representation module further includes an entrance surface module at which the one or more processing devices are configured to:

receive the camera input ray;

based at least in part on the camera input ray, compute a pancake lens incident ray; and output the pancake lens incident ray.

11. The computing system of claim 10, wherein, at the entrance surface module, the one or more processing devices are configured to execute an iterative root solver selected from the group consisting of a Newton-Raphson solver, a Halley solver, and a secant solver.

12. The computing system of claim 10, wherein the physical lens representation module further includes a first refraction module at which the one or more processing devices are configured to:

receive the pancake lens incident ray;

based at least in part on the pancake lens incident ray, compute a refracted incident ray; and output the refracted incident ray.

13. The computing system of claim 12, wherein the physical lens representation module further includes an exit surface module at which the one or more processing devices are configured to:

receive the refracted incident ray;

based at least in part on the refracted incident ray, compute a pancake lens outgoing ray; and output the pancake lens outgoing ray.

14. The computing system of claim 13, wherein:

the physical lens representation module further includes a second refraction module at which the one or more processing devices are configured to:

receive the pancake lens outgoing ray;

based at least in part on the pancake lens outgoing ray, compute a refracted outgoing ray; and the one or more processing devices are further configured to compute the estimated feature location by tracing the refracted outgoing ray to a calibration target surface of the calibration target.

15. The computing system of claim 1, wherein the one or more processing devices are further configured to:

store the calibration results in HMD device memory included in the HMD device; and at an HMD device processor included in the HMD device:

receive eye tracking data at the eye-tracking camera;

compute a gaze direction of a user based at least in part on the eye tracking data and the calibration results; and output the gaze direction to an additional computing process.

16. A method of calibrating an eye-tracking camera included in a head-mounted display (HMD) device between a pancake lens and a display panel, the method comprising:

receiving lens tolerance range data associated with:

a plurality of intrinsic lens parameters of the pancake lens; and a plurality of lens position parameters of the pancake lens;

receiving measured image data of one or more ground-truth features on a calibration target;

over a plurality of solver iterations, computing calibration results as respective estimated values of the plurality of intrinsic lens parameters and the plurality of lens position parameters, wherein each of the solver iterations includes:

computing one or more estimated feature locations based at least in part on the measured image data and on respective perturbed values of the plurality of intrinsic lens parameters and the plurality of lens position parameters, wherein the perturbed values are computed based at least in part on the lens tolerance range data;

computing a value of a loss function based at least in part on the one or more estimated feature locations and one or more respective ground-truth locations of the one or more ground-truth features; and updating the perturbed values based at least in part on the value of the loss function; and outputting, as the calibration results, the perturbed values computed in a final solver iteration of the plurality of solver iterations.

17. The method of claim 16, wherein the plurality of intrinsic lens parameters include a radius, a conic constant, a thickness, and a refractive index of the pancake lens.

18. The method of claim 16, wherein the plurality of lens position parameters include:

a distance and an angle between the pancake lens and the eye-tracking camera; and one or more respective distances and angles between the pancake lens and the one or more ground-truth features.

19. The method of claim 16, wherein:

computing each of the one or more estimated feature locations includes inputting, into a physical lens representation module, a measured pixel location included in the measured image data; and the physical lens representation module is parametrized by the perturbed values of the plurality of intrinsic lens parameters and the plurality of lens position parameters.

20. A computing system comprising:

one or more processing devices configured to:

calibrate an eye-tracking camera included in a head-mounted display (HMD) device between a pancake lens and a display panel, wherein calibrating the eye-tracking camera includes:

receiving lens tolerance range data associated with:

a plurality of intrinsic lens parameters of the pancake lens; and a plurality of lens position parameters of the pancake lens;

receiving measured image data of one or more ground-truth features on a calibration target; and over a plurality of solver iterations, computing calibration results at least in part by iteratively recomputing respective perturbed values of the plurality of intrinsic lens parameters and the plurality of lens position parameters that are located with respective tolerance ranges included the lens tolerance range data;

transmit to the HMD device, as the calibration results, the perturbed values computed in a final solver iteration of the plurality of solver iterations;

store the calibration results in HMD device memory included in the HMD device; and at an HMD device processor included in the HMD device:

receive eye tracking data at the eye-tracking camera;

compute a gaze direction of a user based at least in part on the eye tracking data and the calibration results; and output the gaze direction to an additional computing process.

* * * * *